US010731990B2

(12) United States Patent
Gawrilow

(10) Patent No.: US 10,731,990 B2
(45) Date of Patent: Aug. 4, 2020

(54) RECONSTRUCTING ROUTES USING ELECTRONIC MAP DATA

(71) Applicant: TomTom Navigation B.V., Amsterdam (NL)

(72) Inventor: Ewgenij Gawrilow, Berlin (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 58 days.

(21) Appl. No.: 15/124,070

(22) PCT Filed: Mar. 6, 2015

(86) PCT No.: PCT/EP2015/054782
§ 371 (c)(1),
(2) Date: Sep. 7, 2016

(87) PCT Pub. No.: WO2015/132407
PCT Pub. Date: Sep. 11, 2015

(65) Prior Publication Data
US 2017/0016730 A1     Jan. 19, 2017

(30) Foreign Application Priority Data
Mar. 7, 2014  (GB) .................................. 1404040.6

(51) Int. Cl.
*G01C 21/20* (2006.01)
*G01C 21/30* (2006.01)
(Continued)

(52) U.S. Cl.
CPC ............. *G01C 21/20* (2013.01); *G01C 21/30* (2013.01); *G01C 21/3453* (2013.01); *G01C 21/36* (2013.01)

(58) Field of Classification Search
CPC ................. G01C 21/26; G01C 21/3415; G01C 21/3446; G01C 21/3453; G01C 21/3484;
(Continued)

(56) References Cited

U.S. PATENT DOCUMENTS 6,292,743 B1 *  9/2001  Pu ......................... G01C 21/26
                                                      455/456.6
8,630,794 B2    1/2014  Tava
(Continued)

FOREIGN PATENT DOCUMENTS

CN          1637790 A      7/2005
CN         103499828 A     1/2014
(Continued)

OTHER PUBLICATIONS

Search Report of United Kingdom Application No. GB1404040.6 dated Sep. 9, 2014.
(Continued)

*Primary Examiner* — Tuan C To
*Assistant Examiner* — Paul A Castro

(57) ABSTRACT

A navigation device (300) transmits data indicative of an origin and destination of a desired route through a navigable network to a server. The server (310) generates a recommended route and provides data indicative of the route to a system (320) which provides a polyline representative of the route. The polyline is provided to the navigation device (300), which uses the polyline data to reconstruct the route. The navigation device (300) determines a least cost route through the network using the polyline data in order to reconstruct the route in respect to its own electronic map data. This is done by penalising segments depending upon their distance from the polyline, such that segments further from the polyline are less likely to be included in the route.

19 Claims, 7 Drawing Sheets

(51) Int. Cl.
*G01C 21/34* (2006.01)
*G01C 21/36* (2006.01)

(58) Field of Classification Search
CPC ............ G01C 21/3492; G01C 21/3667; G01C 21/343; G01C 21/3476; G01C 21/3608; G01C 21/3617; G01C 21/362; G01C 21/3626; G01C 21/30; G01C 21/3407; G01C 21/367; G01C 21/3682; G08G 1/096827; G08G 1/096838; G08G 1/096811; G08G 1/096861; G08G 1/096883; G08G 1/0968; G08G 1/096822
See application file for complete search history.

(56) References Cited

U.S. PATENT DOCUMENTS

| | | | |
|---|---|---|---|
| 8,645,061 | B2 | 2/2014 | Newson et al. |
| 9,020,759 | B2 | 4/2015 | Iaccarino |
| 2011/0288762 | A1 | 11/2011 | Kuznetsov |
| 2011/0313648 | A1* | 12/2011 | Newson ............... G01C 21/30 701/447 |
| 2012/0053836 | A1 | 3/2012 | Iaccarino |
| 2012/0109507 | A1 | 5/2012 | Tava |
| 2012/0323486 | A1* | 12/2012 | Wartenberg ........ G01C 21/3446 701/428 |
| 2013/0046464 | A1* | 2/2013 | Vis ...................... G06Q 10/04 701/527 |
| 2013/0332057 | A1 | 12/2013 | Moore et al. |
| 2017/0206784 | A1* | 7/2017 | Pu ....................... G01C 21/26 |

FOREIGN PATENT DOCUMENTS

| | | |
|---|---|---|
| CN | 103818384 A | 5/2014 |
| CN | 104066637 A | 9/2014 |
| EP | 1122518 A1 | 8/2001 |
| EP | 1788355 A1 | 5/2007 |
| EP | 2213982 A2 | 8/2010 |
| GB | 2487263 A | 7/2012 |
| JP | 2001041757 A | 2/2001 |
| JP | 2005147982 A | 6/2005 |
| JP | 2011191065 A | 9/2011 |
| WO | 0040930 A1 | 7/2000 |
| WO | 2007079042 A3 | 11/2007 |
| WO | 2010077233 A1 | 7/2010 |

OTHER PUBLICATIONS

Partial ISR Application No. PCT/EP2015/054782 dated Jun. 24, 2015.
ISR Application No. PCT/EP2015/054782 dated Oct. 23, 2015.

* cited by examiner

RECONSTRUCTING ROUTES USING ELECTRONIC MAP DATA

CROSS-REFERENCES TO RELATED APPLICATIONS

This application is the National Stage of International Application No. PCT/EP2015/054782, filed Mar. 6, 2015, and designating the United States, which claims benefit to United Kingdom Patent Application No. 1404040.6 filed Mar. 7, 2014. The entire content of these applications is incorporated herein by reference.

FIELD OF THE INVENTION

This invention relates to methods and systems for generating routes through a navigable network in relation to an electronic map representing the navigable network, and also extends to navigation devices arranged to generate such routes. The invention is applicable to the generation of a route that occurs in order to reconstruct a route through the navigable network in relation to the electronic map. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

More recently it has been recognised that there may be some drawbacks associated with arrangements in which a navigation device generates routes independently, in a stand-alone manner. Often users do not update the electronic map data of the navigation device regularly, which may prevent optimal routes from being generated by the device. Furthermore, the storage and processing capacity of such devices is inherently limited, which may constrain the route generation process, and limit the amount of information that the device is able to provide in relation to the generated route. For example, the device may not be able to provide additional non-core information that may be of interest to the user in relation to the route, such as audio street name prompts.

One alternative approach to generating routes is for all electronic map data and routing functionality to be provided at a server on behalf of client navigation devices. A navigation device will then submit a request for a route to a server. The server generates the route on behalf of the device, and transmits it to the device, in some cases together with the electronic map data that will be required by the device in order to use the route. This may overcome some of the problems associated with systems in which the route generation is carried out entirely by a navigation device. For example, a server may have access to up to date electronic map data, and will have the processing and storage capability to carry out more complex routing processes. The server may provide more detailed route data to the navigation device, allowing the device to use such data without needing to store more detailed electronic map data itself. However, relying entirely upon a server to provide routing functionality in this way may be problematic. For example, when a navigation device is unable to establish communication with the server, route generation will not be possible. Difficulties are compounded in arrangements which also rely upon the navigation device being able to communicate with the server in order to obtain map data.

In order to address certain of these problems, it has been recognised that rather than having route generation occur entirely at either a navigation device or server, it may be advantageous for route generation to be carried out in part by the navigation device, and in part by a server in communication therewith. This type of system is known as a "hybrid" routing system. In these arrangements, both the server and navigation device have access to electronic map data. A navigation device may provide details of an origin, whether a current position or user specified position, and a destination for a desired route to the server, and request that the server generates a route between the origin and destination. The server may then generate the route in relation to its own electronic map data. As the server will have greater processing power and storage capacity than a client navigation device, it may employ more complex routing processes. Furthermore, the server may have access to more up to date and comprehensive electronic map data. The electronic map data may be customised in a proprietary manner. For example, a server may generate a route using electronic map data from a vehicle manufacturer that incorporates point of interest data that is considered to be relevant to users of their vehicles.

Once the route is generated, the server transmits the route to the client navigation device that requested the route. Thus, the route generation occurs off-board, i.e. external to the navigation device. Before the client navigation device can use the received route, e.g. to provide navigation instructions and/or display the route, it must carry out an operation to reconstruct the received route in relation to its own local electronic map data. This is because the received route may not be in the same format that is required by the navigation device, and it will generally not have been generated in relation to the same electronic map data that is held by the navigation device. It is necessary to match locations associated with the generated route to locations in the local electronic map of the device. For example, a server may provide generated route information to client devices in a generic format, from which the individual devices may then reconstruct routes in the manner required for compatibility with their own specific electronic map data.

It will be seen that such hybrid routing systems may retain some of the benefits associated with route generation solely at either a navigation device or server, while mitigating some of the drawbacks of those systems. Examples of hybrid routing systems are described in WO 2007/079042 A2, entitled "Intelligent Location Based Services and Navigation Hybrid System", and WO 00/40930 A1 entitled "Mobile Navigation System".

There are some challenges involved in implementing hybrid routing systems. One particular problem is concerned with the reconstruction of received routes by a client navigation device. In order to do this, the navigation device needs to be able to correlate data indicative locations to be included in the route which is received from the server with locations represented by its own electronic map data.

One way to achieve this is for the server to use an identical map when generating the route to the local electronic map that is used by the navigation device. The navigation device may then simply identify specified navigable segments for inclusion in the route from the received generated route information as the navigable segments would have the same identifier in both sets of map data. However, in practice, such arrangements are unduly limiting.

Various techniques have been proposed that are intended to allow a navigation device to reconstruct a route received from a server without requiring the server to generate the route in relation to the same electronic map that is used by the device. One such technique involves the server transmitting a generated route in the form of a list of waypoints. The navigation device then correlates the waypoints with locations represented by its electronic map, and constructs a route that passes through the waypoints. However, such methods may be inefficient in that in order to accurately describe a generated route, a large number of waypoints may be needed. Furthermore, there may be difficulties in matching received waypoints to locations in the local electronic map of the navigation device, particularly where the device map data is of significantly lower quality or resolution than the server map data. For example, the server may transmit the coordinates of a waypoint. However, these coordinates may correlate to a different position in the device map than in the server map.

One way to try to avoid problems arising due to differences between server and device electronic maps, is to use map agnostic location referencing. The server may generate a route in relation to its electronic map data, and convert the route information, e.g. waypoints into a map agnostic form for transmission to a navigation device. This may be carried out by encoding the locations, e.g. of waypoints in accordance with a map agnostic location referencing system. The device may receive the encoded location information, and decode the information to obtain a location in its own electronic map that corresponds to the location in the server's electronic map that was originally encoded. Examples of such map agnostic systems include AGORA-C, OpenLR™ and TPEG-ULR. These techniques typically encode the route (or line location) as a set of location points, specified by coordinate pairs of latitude and longitude, and ordered in a list; the location points each being provided with one or more additional attributes (typically derived from the electronic map data) that can assist in better defining the location when decoding the line location on a different electronic map.

In addition to any difficulty with map matching, one further drawback with the existing hybrid routing systems is that when reconstructing the received route, the navigation device attempts to recreate, i.e. replicate the route generated by the server. The navigation device does not have the latitude to modify the route, e.g. if live data available to the device suggests that an alternative to at least a portion of the route may be preferable. For example, the device may have access to live traffic information that indicates that a part of the route is affected by a jam.

The Applicant has realised that there remains a need for improved methods and systems which enable the reconstruction of a given route through a navigable network in relation to an electronic map representative of the network, e.g. by a navigation device. Although being particularly advantageous in the context of hybrid routing, enabling the reconstruction of a route received by a navigation device from a server, the methods and systems of the invention have wider applicability than merely in the reconstruction of a previously calculated route, and may also be used in any context where it is desired to reconstruct a route, such as in the reconstruction of a previously travelled route.

SUMMARY OF THE INVENTION

In accordance with a first aspect of the invention there is provided a method of reconstructing a route through a navigable network in an area covered by an electronic map, the electronic map comprising a plurality of segments representing navigable segments of the navigable network, the method comprising:

obtaining data indicative of a polyline representative of a route through the navigable network, which route is to be reconstructed in relation to the electronic map; and using the obtained data indicative of the polyline in generating a route through the navigable network as represented by the electronic map, wherein the generated route provides a reconstruction of the route represented by the polyline through the navigable network in relation to the electronic map, and wherein the generating of the route comprises favouring segments of the electronic map for inclusion in the generated route that are in greater proximity to the polyline as represented on the electronic map.

In accordance with the invention, therefore, data indicative of a polyline is obtained, which represents a route through the navigable network in an area covered by an electronic map. The route is a route which it is desired to reconstruct by reference to the electronic map. The data indicative of a polyline is then used in generating a route through the navigable network represented by the electronic map, which generated route provides the desired reconstruction of the route represented by the polyline.

By providing data indicative of a polyline which represents the route to be reconstructed on the electronic map, and then reconstructing the route by generating a route through the navigable network represented by the electronic map using the polyline data, a route may be reconstructed in a more flexible manner, enabling other desired factors to be taken into account in the routing process. This is particularly useful where the route to be reconstructed is a recommended route. The route generation to provide the reconstructed route may be performed according to any usual desired route generation preferences, and preferably taking into account live conditions in the navigable network, but in a manner that additionally takes into account the polyline data. The polyline data may be used to cause the generated route to generally follow the polyline, subject to any other constraints or preferences in the route generation process. However, the route generation process is not constrained to merely try to recreate the polyline as represented on the electronic map. For example, where a segment that might correspond to a portion of the polyline as represented in the electronic map is closed, or affected by a traffic jam, the routing process is free to route around this segment as during a normal route generation process which does not use polyline data. Thus, the polyline data is used in addition to the other data that would normally be used during route generation, e.g. other cost data to provide the reconstructed route.

The reconstruction of the route is also achieved in a manner that does not require the information indicative of the route to be reconstructed to be in relation to the same electronic map that the route is to be reconstructed in relation to. The polyline data may be used during the route generation process, e.g. to guide the process that provides the reconstructed route, rather than to produce a route that exactly recreates the polyline, and it is therefore not critical if the polyline cannot be matched exactly to segments of the electronic map and/or is matched to segments that do not exactly correspond to the segments of an electronic map used to produce the polyline. In embodiments in which the invention is applied to reconstructing a previously travelled route, when it may be desirable for the reconstructed route to conform as far as possible to the original route, the use of the polyline facilitates reconstruction of a route in relation to any desired electronic map, without needing to initially record the route in relation to the same map.

Reconstruction of the route in relation to the electronic map will enable operations to be conducted in relation to the route, e.g. issuing navigation instructions, displaying the route, etc. It will be appreciated that references to "reconstructing" the route herein do not require that the reconstructed route must attempt to exactly recreate the route to be reconstructed i.e. that is represented by the polyline (although this may, in some situations be the case, e.g. where a previously travelled route is reconstructed). The reconstruction of the route instead refers to the process of generating a route in relation to the electronic map data using the polyline data that at least generally corresponds to the route to be reconstructed. However, the reconstructed route may be generated in a manner that takes into account any other desired factors, e.g. planning preferences and/or live data, and with the freedom to deviate from the route to be reconstructed if appropriate, e.g. due to traffic conditions, road closures, etc.

The steps of the method of the present invention in any of its aspects or embodiments may be carried out in part by a server and in part by a navigation device. The steps of the method may be performed exclusively on a server, or some on a server and the others on a navigation device in any combination, or exclusively on a navigation device. Thus, the system of the present invention in its further aspects discussed below may be provided in part by a navigation device or other mobile device, and in part by a server.

The method of reconstructing the route of the present invention is preferably implemented in the context of a navigation operation. Thus, the method is preferably carried out by a set of one or more processors of a device or system having navigation functionality. However, it will be appreciated that the methods may also be carried out by any suitable system having route generating capability, but not necessarily navigation functionality. For example, the methods may be implemented by a computer system, e.g. a desktop or laptop system, which does not have navigation functionality.

In preferred embodiments the steps of obtaining the polyline data and using the data in generating a route to reconstruct the route represented by the polyline are carried out by a navigation device, and the present invention extends to a navigation device arranged to carry out such steps of the method of any of the aspects or embodiments of the invention. The device is preferably a mobile device. The navigation device may be a personal navigation device (PND) or an integrated, e.g. in-vehicle, device. The method of route reconstruction of the invention is particularly advantageous when implemented using a navigation device, allowing the device to generate a route that reconstructs a received route in a more efficient manner, and which provides the opportunity for the reconstructed route to take into account live data. Thus, in these preferred embodiments, the present invention may provide an improved method for reconstructing a received route in a hybrid routing system, enabling a navigation device to reconstruct a route that is generated off board, e.g. by a server, in relation to the device's own electronic map data.

In accordance with any of the aspects or embodiments of the invention the navigation device may comprise a display for displaying the electronic map to a user, a set of one or more processors configured to access the electronic map data and cause the electronic map to be displayed to a user via the display, and a user interface operable by a user to enable the user to interact with the device. Thus, the system of the present invention may be a system, e.g. processing device of a navigation device.

The present invention extends to a system for carrying out a method in accordance with any of the aspects or embodiments of the invention herein described.

In accordance with a second aspect of the invention there is provided a system for reconstructing a route through a navigable network in an area covered by an electronic map, the electronic map comprising a plurality of segments representing navigable segments of the navigable network, the system comprising:

means for obtaining data indicative of a polyline representative of a route through the navigable network, which route is to be reconstructed in relation to the electronic map; and means for using the obtained data indicative of the polyline in generating a route through the navigable network as represented by the electronic map, wherein the generated route provides a reconstruction of the route represented by the polyline in relation to the electronic map, and wherein the generating of the route comprises favouring segments of the electronic map for inclusion in the generated route that are in greater proximity to the polyline as represented on the electronic map.

Preferably the system comprises, or is, a navigation device which provides the means for obtaining the data indicative of the polyline and means for using the obtained polyline data in generating a route.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

Accordingly, the method of reconstructing a route of the present invention, or at least the steps of obtaining and using the polyline data in route generation, is preferably carried out by a navigation device, and the system for reconstructing the route of the invention is preferably provided, at least in part, by a navigation device. The navigation device is a device having access to the electronic map data. The navigation device then carries out, or comprises means for carrying out, the steps of obtaining the polyline data and using the data in generating the route. The step of generating the route is preferably carried out by a routing engine of the navigation device. In any of the embodiments in which a navigation device is used, preferably the navigation device stores the electronic map, i.e. electronic map data. The navigation device may comprise means for storing the electronic map. The electronic map data that is stored may be data that has been received and stored for use in route reconstruction in accordance with the invention. For example, the device may receive the polyline data together with the applicable electronic map data for use in route reconstruction from a server, or may receive data indicative of a location from which the electronic map data may be retrieved from a server, optionally together with the polyline data, which enables the device to request that the data be transmitted to it, such that the electronic map data is received separately and subsequently to the polyline data. Thus, the device may not store a complete electronic map, but instead may receive applicable electronic map data from a server, e.g. based upon a current position of the device and/or a route to be reconstructed, to enable it to carry out the methods of the present invention.

In accordance with the invention, polyline data is obtained representative of the route through the network that is to be reconstructed. The term "polyline" is used herein in its conventional sense. The polyline is defined by a series of points connected by line segments. The data indicative of the polyline may be indicative in any manner of the polyline, whether directly or indirectly. For example, the polyline data may comprise a list of the points (e.g. in the form of latitude and longitude coordinates) defining the polyline and/or data indicative of the line segments connecting the points. The points may be spaced between 20 and 100 metres apart; so as to optimum processing efficiency. The term "polyline" as used herein encompasses the possibility of the polyline being a closed polyline. A closed polyline may be used to represent a route in which the start point and the end point are the same. The polyline is indicative of a start location and end location for the route that it represents.

In preferred embodiments of the invention, the polyline data consists of a sequence of points, e.g. coordinate pairs. In other embodiments, the polyline data can comprise a sequence of stretches that are encoded in an map agnostic manner, e.g. using location reference systems such as OpenLR™, AGORA-C and TPEG-ULR.

The data indicative of the polyline is representative of a route to be reconstructed. The route to be constructed may be any path through the navigable network. The path may be a path that is to be travelled, e.g. a recommended route, or which has previously been travelled. It will be appreciated that a "route" as used herein need not be a pre-planned route, e.g. between first and second locations. In some embodiments the route is a path previously travelled through the navigable network. The route may alternatively be a predicted future path.

In some preferred embodiments the route to be reconstructed is a pre-planned route. The pre-planned route may be a route for immediate or future travel. A pre-planned route may be a pre-calculated route, i.e. a route which has been calculated by a routing algorithm. The route is preferably an externally generated route. The route is generated externally to the device, e.g. navigation device, that carries out the steps of obtaining and using the polyline data in reconstructing the route. In other words, the route is generated off-board. Preferably the route is a route that has been generated by a server. In some embodiments the route is a route that has been generated in response to a request by a navigation device, e.g. the device that obtains and uses the polyline data. However, this is not necessarily the case. For example, the route may be a route that has been generated by interaction of a user with a route planning website. As the present invention provides data indicative of the route to be reconstructed that is in the form of a polyline representation, and which is then used to reconstruct the route in relation to the relevant electronic map, route reconstruction may be achieved based on initial route data in a wide variety of formats, providing greater flexibility than existing hybrid routing systems. There is no need for the initial route data to be of any specific form. Thus, the initial route may be a route generated using any route planning system. For example, a generic route planning website may be used, or a route planning website or similar that is provided by a particular vehicle manufacturer, etc. The method may extend to the step of generating the pre-planned route to be reconstructed. Thus, the pre-planned route may be any form of recommended route.

A pre-planned route may be a route that is generated prior to commencing travel through the navigable network, or during travel through the navigable network, e.g. in relation to a remainder of a route being travelled. For example, the pre-planned route may be a route that is generated as an en-route alternative when a problem is encountered with a route that is currently being travelled. The pre-planned route may be a route that is generated in response to a detected deviation from a previously planned route, e.g. to return to the original route.

In general, it may be seen that in preferred embodiments at least, in which a route pre-planned by a server is reconstructed by a client navigation device, the present invention allows server side route planning to be decoupled from client side route planning. In these embodiments in which the route is a pre-planned route, the route may be a route that has been planned, e.g. by a server or other route planning system, at any time prior to the reconstruction of the route, and not necessarily in the immediate past. By way of example, a user might use a website to plan a route that they intend to follow the next day. The reconstruction of the route using polyline data representative of the route may be carried out the next day by a navigation device, immediately prior to departure. This will enable the reconstruction of the route to take into account live data, e.g. traffic data, while generally conforming to the pre-planned route.

Whether or not it is a pre-planned route, the route to be reconstructed may be a route between a first location and a second location. The first location may be a current location, or an origin. The current location may be a current location of a navigation device, and preferably of the navigation device that uses the polyline data in reconstructing the route. The second location may be a destination. In embodiments in which the route is pre-planned, one or both of the first and second locations may be user specified and/or received from a navigation device for use in generation of the pre-planned route. For example, a user may input the location(s) into an appropriate route planner, or a navigation device may transmit data indicative of the first and second locations, e.g. to a server, together with a request for a route to be planned between the first and second locations. Of course, the first and second locations could be specified in any other manner, e.g. by a server, etc. In embodiments which extend to the step of generating the route to be reconstructed, the method may comprise the step of a server receiving a request for a route to be generated from a navigation device (preferably the navigation device that obtains and uses the polyline data), the request comprising data indicative of a first and second location between which the route is to be generated, and generating a route between first and second locations. Alternatively or additionally, one or both of the first and second locations may be automatically determined, e.g. by the navigation device. For example, a first location may be a location along a remainder of a currently travelled route from which location it is desired to re-plan the route, e.g. in view of traffic conditions. In some embodiments it is envisaged that a navigation device may periodically provide data indicative of the current position of the device to a server.

The polyline may or may not extend from the first location to the second location that the route to be reconstructed extends between. However, in preferred embodiments the polyline does extend from the first location to the second location.

In other embodiments discussed in more detail below, rather than being a pre-planned route, the route to be reconstructed may be a route that has previously been travelled through the network e.g. by a vehicle.

The step of obtaining the data indicative of the polyline, which is preferably carried out by a navigation device which then uses the data in reconstructing the route, may comprise the step of receiving the data. The data indicative of the polyline is preferably received over a wireless communications link. The data indicative of the polyline may be obtained from any source or sources. Preferably the method comprises receiving the data indicative of the polyline from one or more external sources. Thus the data is received from a source or sources external to the device that uses the data in route reconstruction, e.g. a navigation device. In some preferred embodiments the data indicative of the polyline is obtained, i.e. received from one or more server. The server may or may not be the same server that generates the route to be constructed that the polyline represents, in embodiments in which such a route is generated. In these preferred embodiments, which may be applicable, e.g. to a hybrid routing system, a device that uses the polyline data to reconstruct a route need not have access to, or at least need not generate, the route that the polyline represents. In other embodiments the step of obtaining the data indicative of the polyline may comprise the step of generating the data indicative of the polyline using data indicative of the route through the navigable network to be reconstructed. Such a step may be carried out by a navigation device.

Where polyline data is received, the data may be received together with other route related data. In some embodiments the polyline data is received together with data indicative of first and second locations between which the route to be reconstructed extends. This may be appropriate where the polyline does not itself extend to these locations, or not exactly to those locations. Such data may be useful in route generation to reconstruct the route.

In some embodiments in which the method comprises the step of receiving the polyline data, the method may further comprise receiving the electronic map data in relation to which the route is to be reconstructed. The electronic map data may be received associated with the polyline data or separately thereto, e.g. subsequently. For example, the electronic map data may be received in response to a later request made after receipt of the polyline data. In embodiments in which electronic map data is received, the data may be received from a server. The method extends to the step of, e.g. a server, making the electronic map data available, e.g. to a navigation device. These embodiments are particularly applicable where the steps of obtaining the polyline data, i.e. receiving the data, and using the data to reconstruct the route are carried out by a navigation device. By additionally making the electronic map data available to the device, it is not necessary for the device to store electronic map data in advance for the relevant region. The method may comprise transmitting the electronic map data, optionally with the polyline data. It will be appreciated that the electronic map data may be transmitted directly to a navigation device, or in response to a request by the device. The method may comprise making the electronic data available to a device to enable the electronic map data to later be retrieved by the device. In some embodiments the method comprises a server providing a navigation device associated with data indicative of a location from which the electronic map data may be retrieved by the device. This may be in the form of a link or similar. The data indicative of the location may be transmitted to the device together with the polyline data. This step may be performed by a server transmitting the location data to a navigation device. The device may retrieve applicable electronic map data from the server as required. However and whenever it is transmitted, the electronic map data that is received may be based on the location of the route represented by the polyline data and/or the current position of the device. In these embodiments, the route to be reconstructed is typically a portion of a longer route, with the server transmitting data indicative of the polyline representative of the portion of the route as well as making the relevant electronic map data required by the device for the reconstruction of the route available to the device. The method may comprise a navigation device storing received electronic map data. In some embodiments the received polyline data is associated with the electronic map data for use in reconstruction, or data which may be used to retrieve the electronic map data, the method further comprising receiving and storing the electronic map data for use in route reconstruction.

The method in accordance with any of its embodiments, and regardless of which component(s) of the system carry out the step, may extend to the step of using data indicative of the route through the navigable network to be reconstructed to generate the polyline data representative thereof. The step may be carried out by a server or a navigation device. For example, in hybrid routing type embodiments or otherwise in which the route is a pre-planned route, the step may typically be carried out by a server in order to obtain polyline data for transmission to a navigation device. In other embodiments a navigation device may carry out this step using route data that has been obtained by the device in some manner. For example, route data indicative of a route planned by an external route planning system may be input to the device by a user. Where the step of using route data to generate the polyline data is carried out by a server, the server may or may not be the same server that generates the route to be reconstructed, in embodiments where such a step is carried out. In other embodiments a navigation device may carry out the step, e.g. using data indicative of a route to be reconstructed provided, e.g. by a user from an external source, or using time-stamped positional data indicative of a route that has been travelled.

In any of the embodiments of the invention, wherever such a step is performed, the step of obtaining the route data for use in generating polyline data may comprise receiving the data in any suitable manner, e.g. via a wireless communications link. The data indicative of the route to be reconstructed may be obtained from an external source, e.g. a server. In some embodiments, a server may receive the route data from another server, and use the data to generate the polyline data for transmission to a navigation device for use in route reconstruction. Of course, the external source may be any device, and need not be a server. In other embodiments a navigation device may receive the route data and use the data to generate the polyline data. The data may be transmitted to the device automatically or in response to a request by a user. A user may transfer details of a planned route to the device from another device or system having route planning functionality. As described above, data indicative of a route to be reconstructed may be obtained from a wide range of sources for use in the invention. The step of obtaining the route data may alternatively comprise generating a route to provide a pre-planned route in any of the manners described above. In other embodiments, for example in which the route to be reconstructed is a previously travelled route, it is envisaged that the step of generating the polyline data may be carried out by a navigation device, e.g. the same device which is to reconstruct the route, using data indicative of the travelled route. The step of obtaining the data indicative of the route to be reconstructed may then comprise obtaining time-stamped positional data indicative of the route as described in more detail below.

In accordance with the invention in any of its embodiments in which the method comprises a step of generating the data indicative of the polyline using data indicative of the route to be reconstructed, the method may comprise a step of obtaining data indicative of the route to be reconstructed in relation to an electronic map, preferably a different electronic map to that in relation to which the route is reconstructed, and optionally converting the route data to a map agnostic form for use in generating the polyline data. For example, any suitable map agnostic location reference system may be used, such as the OpenLR™ AGORA-C and TPEG-ULR methods described above, or any other such systems. This may enable polyline data to be obtained that is in relation to such a map agnostic location reference system as in the preferred embodiments discussed above.

The data indicative of the route to be reconstructed that is used in generating the polyline data may be any data that is indicative of the route. The data may be data indicative of a list of navigable segments of the navigable network that are included in the route. The list of navigable segments is preferably by reference to a map agnostic location referencing system, although may be by reference to an electronic map. The data indicative of the navigable segments may be used to obtain the series of points defining the polyline. The polyline data that is obtained is representative of the route to be reconstructed. In embodiments the step of generating the polyline data using data indicative of the route to be reconstructed may comprise generating the polyline data using data indicative of navigable segments that are included in the route to be reconstructed. In some embodiments the method may comprise using data indicative of the navigable segments included in the route to identify line segments for inclusion in the polyline. It will be appreciated that the polyline described by the polyline data may be identical or at least similar to the route to be reconstructed. The polyline may be an approximation of the route to be reconstructed. The step of generating the polyline data may involve some generalisation of the data, e.g. a reduction in the number of points defining the polyline if desired, to facilitate processing of the polyline data during reconstruction of the route.

While the invention has been described by particular reference to embodiments in which the route to be reconstructed is a pre-planned route that is to be travelled, the methods of the invention are equally applicable to reconstructing a previously travelled route. The method may extend to the step of using data indicative of the previously travelled route in obtaining polyline data representative of the route. The step may be carried out by a navigation device, which is preferably a navigation device that travelled the route, and which carries out route reconstruction. The method may extend to the step of obtaining the data indicative of a previously travelled route. The step of obtaining the data may comprise accessing stored data indicative of the previously travelled route, or may extend to the step of generating the data indicative of the previously travelled route. In these embodiments the steps of obtaining the data and/or using the data in obtaining the polyline data are preferably carried out by a navigation device, which device is preferably the device that uses the polyline data to reconstruct the route. In any of the embodiments using data indicative of a previously travelled route, the data indicative of the previously travelled route preferably comprises data relating to the movement of the or a device with respect to time along the previously travelled route. It will be appreciated that the previously travelled route may be any path through the navigable network between a first location and a second location. The route need not be a route that was pre-planned.

The data indicative of a previously travelled route is preferably positional data (e.g. geographical coordinates, such as longitude and latitude) with associated timing data, e.g. time-stamped positional data. While time-stamped positional data is preferably used, any positional data having associated timing data may be used in the embodiments described herein, and it should be understood that any reference to "time-stamped positional data" may be replaced by a reference to "positional data with associated timing data" to the extent this is not mutually inconsistent. The positional data may be data obtained from a global navigation satellite system (GNSS) receiver, or any other suitable position determining means, such as by using a mobile telecommunication network (e.g. GSM). The data is historical positional data. The positional data with its associated timing data may be in the form of a positional trace. In preferred embodiments, the previously travelled route is a route travelled by the navigation device that uses the data to obtain the polyline data. However, the route may be a route travelled by another device. The device may be any device capable of providing positional data and sufficient associated timing data for the purposes of the present invention, and may or may not be a navigation device. The step of obtaining the route data may comprise receiving data relating to the movement of a or the device with respect to time through the network. In some embodiments the method may extend to the step of storing data indicative of the movement of a or the device with respect to time, e.g. time-stamped positional data, during travel of the device along a route to provide the data indicative of the previously travelled route. In preferred embodiments this step is carried out by the same navigation device that then carries out route reconstruction, and preferably using data relating to the previous movement of that same device. The present invention enables such data indicative of previously travelled routes to be used to reconstruct the routes in relation to the electronic map data of the particular device.

In preferred embodiments at least in which the data that is used to obtain the polyline representative of a previously travelled route is data indicative of the position of a device with respect to time, such data will inherently be map agnostic. By carrying out the intermediate step of representing such data using a polyline, the route may be reconstructed in relation to a particular electronic map in a manner which may remain accurate even after map update operations or similar. It is envisaged that a database may be created storing data indicative of multiple previously travelled routes. By obtaining polyline data representative of each such route and then using the polyline data to reconstruct the route in relation to a given electronic map in accordance with the embodiments of the invention, a database of previously travelled routes in relation to a particular electronic map may be created. The database may be stored, for example, by the navigation device that reconstructed the routes. Previous attempts to build up a database of previously travelled routes using a navigation device would revolve around storing the routes in relation to the electronic map data of the device at the relevant time. For example, the route might be stored in terms of manoeuvres which occurred relative to specific segments of the electronic map. However, such routes may not then be reliable or even usable at a later time following updating of the device's electronic map. These further embodiments of the invention may be used in relation to previously travelled routes that are, for example: frequently travelled routes; routes between certain points of interest, such as home, work, gym; etc.

In some embodiments in which the steps of obtaining the polyline data and using the data to reconstruct a route through the navigable network are carried out by a navigation device, the method comprises the navigation device storing data indicative of one or more, and preferably a plurality of routes previously travelled by the device through the navigable network in the area covered by the electronic map of the device, and, for each route, using the previously travelled route data to generate data indicative of a polyline representative of the route, using the obtained data indicative of the polyline to generate a route through the navigable network as represented by the electronic map, the generated route providing a reconstruction of the route represented by the polyline, and storing data indicative of the reconstructed route. The data indicative of the previously travelled route is preferably of the type described above, i.e. data indicative of the movement of the device with respect to time during travel along the route, such as time-stamped positional data. The method may comprise repeating these steps to reconstruct a plurality of routes in relation to the electronic map, and creating a database storing data indicative of the reconstructed routes. The device may store a database comprising data indicative of a plurality of previously travelled routes which may provide the previously travelled route data for use in route reconstruction.

It will be appreciated that the route represented by the polyline that is representative of a route to be reconstructed may or may not be the entirety of a route that is to be reconstructed. Alternatively or additionally the route to be reconstructed may or may not be the entirety of a planned route. The route represented by the polyline may be only a portion of a longer route that is to be reconstructed. Thus the route may itself be a sub-route. Where the route is between first and second locations, one or both of the first and second locations may be locations along a longer route to be reconstructed. The route may be a portion of a longer pre-planned route, or of a route the remainder of which has yet to be planned. For example, an overall route may be planned in portions, with the relevant polyline data being generated for each portion and obtained for use in reconstruction, or the entire route may be planned, with the polyline data being generated on a portion by portion basis, etc. It is also envisaged that, alternatively or additionally, the obtained polyline data may be indicative of a portion of a polyline in respect of which data is determined. For example, a server may obtain polyline data representative of an entire route, and transmit portions of the polyline data in respect of portions of the route to a navigation device for use in reconstruction. Portions of the polyline data may be selected for transmission based upon a current position of the device.

In accordance with the invention in any of its aspects or embodiments, the method comprises using the data indicative of the polyline ("the polyline data") to generate a route through the navigable network as represented by the electronic map, which generated route provides a reconstruction of the route represented by the polyline in relation to the electronic map.

The method may further comprise the step of representing the polyline on the electronic map. This step may be carried out by a navigation device that carries out the route reconstruction. This may be done in any suitable manner. For example, segments of the polyline may be matched to segments of the navigable network as represented by the electronic map, or the polyline may simply be superposed on the electronic map without specifically trying to match it to segments of the electronic map. Such steps may be performed by reference to the location of the segments of the polyline according to the location referencing system used for the polyline. These may then be translated to applicable locations represented by the electronic map. As discussed previously, in embodiments of the invention, it is not critical that the polyline segments are or can be precisely matched to segments of the electronic map.

The step of generating the route using the polyline data comprises favouring segments of the electronic map for inclusion in the generated route that are in greater proximity to the polyline as represented on the electronic map. In other words, the segments that are relatively closer to the polyline as represented on the electronic map are favoured in the route generation process over those segments which relatively further from the polyline as represented on the electronic map. In this way, those segments which are in greater proximity to the polyline, i.e. relatively closer to the polyline than other segments of the electronic map, are more likely to be included in the generated route. It will be appreciated that references herein to segments of the electronic map being closer to or further from the polyline refer to the segments being closer to or further from the polyline as represented on the electronic map if not explicitly stated.

By favouring those segments which are in proximity to the polyline, the resulting generated route will be attracted toward the polyline. However, the generated route is not forced to be identical to the polyline. Thus, the segments are caused to be treated more favourably by a routing engine than those which are in lesser proximity to the polyline. The segments may be favoured by applying a positive weighting factor to the segments and/or by penalising those segments that are in lesser proximity to the polyline as represented on the electronic map. This may be achieved by appropriate manipulation of the cost associated with the segments that is used in route generation, i.e. the cost of traversing a segment (after applying the cost function used by the routing engine) is modified, typically reduced, such that the segment is favoured more by the routing engine than would normally be the case; this will be described in more detail below.

It will be appreciated that the segments are favoured relative to other segments of the electronic map based upon their proximity to the polyline, and without taking into account any other preferences and/or constraints imposed on the routing process. In the route generation process, proximity to the polyline is only one of a number of factors that may be taken into account. For example, as is known in the art, factors such as length of segments, transit times for segments, congestion likelihood, etc may be taken into account. Thus it is not necessarily the case that a segment closer to the polyline will always be more likely to be included in the route than an alternative one further away when all relevant factors are accounted for. It is this that provides the invention with the flexibility to provide a reconstructed route that is generally attracted to the polyline, while having the ability to deviate therefrom if appropriate, e.g. if a segment along or close to the polyline is closed or affected by congestion. It will be appreciated that the segments that are favoured or, in some cases, penalised in accordance with the invention are those segments which are considered for the purposes of the route generation. The segments may be a subset of the segments of the electronic map. For example, the segments may be segments of a routing corridor.

The proximity of a segment to the polyline may be assessed in any suitable manner. In some embodiments the method may comprise defining an area based on the polyline as represented on the electronic map, and favouring those segments of the electronic map which are considered to be within the area. In some embodiments this is achieved in part or entirely by penalising those segments which are not considered to be within the area. The area may be an area that includes the polyline, e.g. that is centred thereon. A segment may be considered to be within the area when it is entirely within the area, or at least partially within the area, or where at least a given portion is within the area, etc as desired. The area may be of any shape. In preferred embodiments the area is in the form of a corridor extending along and comprising the polyline. In other embodiments, it is envisaged that the polyline could itself define the area, with the polyline forming a closed loop bounding the area, and the route through the navigable network being represented by the area.

In some embodiments in which segments not considered to be within the area based on the polyline as represented on the electronic map are penalised for inclusion in the route, the method may comprise precluding those segments from being included in the route. In other embodiments, a penalty factor may be applied to the segments so as to make them less likely to be included in the route, without precluding them from inclusion. The penalty factor may be a variable penalty factor depending upon distance of a segment from the polyline as described below.

In accordance with the invention, favouring or penalising a segment for inclusion in the generated route results in the segment being more or less likely respectively to be included in the generated route than other segments of the electronic map which are considered for the purposes of route generation. This is preferably done in a manner that does not result in the segment being required to form part of the route and/or being prevented from so doing. Favouring a segment results in the segment being more likely to be included in the route at least relative to other navigable segments of the electronic map that are considered in route generation, and which are in lesser proximity to the polyline. Favouring a segment may involve applying a positive weighting factor to the segment to increase its likelihood of being included in the generated route, i.e. in comparison to the situation where the positive weighting factor were not applied, and/or may be achieved indirectly by penalising other navigable segments, i.e. those in lesser proximity to the polyline. Penalising a segment may involve applying a penalty factor to the segment to decrease its likelihood of being included in the generated route, i.e. in comparison to the situation were the penalty factor not applied. In preferred embodiments favouring those segments in greater proximity to the polyline in accordance with the invention is implemented by penalising navigable segments based upon their proximity to the polyline as represented on the electronic map. Such embodiments may be readily implemented by applying a suitable penalty factor which may then be taken into account during route generation as part of a cost function in a similar manner to other costs associated with segments, enabling the proximity of segments to the polyline to be treated as another factor to be taken account of when determining a least cost path.

Some preferred embodiments of the invention will now be described by reference to the case in which segments are penalised to result in those segments in greater proximity to the polyline being favoured. Nonetheless, it is envisaged that segments could alternatively be favoured to an extent dependent upon their proximity to the polyline in a similar manner, instead by applying a positive weighting factor to those segments closer to the polyline rather than by applying a negative penalty factor to the segments further away. A positive weighting factor might be applied that is variable, decreasing with increasing distance from the polyline.

In some embodiments, as described above, the method may comprise favouring those navigable segments that are within a given area based upon the polyline by precluding segments outside that area from being included in the generated route. However, in preferred embodiments the method involves the penalising navigable segments to differing degrees in dependence upon their proximity to the polyline. This has the result that the polyline acts to "attract" the route, with the degree of attraction increasing as the polyline is approached.

Preferably the step of favouring segments of the electronic map that are in greater proximity to the polyline as represented on the electronic map involves penalising segments of the electronic map to a degree which depends upon the proximity of the respective segments to the polyline as represented on the electronic map, wherein those segments that are further from the polyline are penalised to a greater degree than those that are closer to the polyline. In other a variable penalty factor depending upon distance from the polyline may be applied. Penalty factors might be applied to all segments, including those relatively close to the polyline, or only to segments that are outside an area based on the polyline, e.g. a corridor extending along the polyline. Thus a variable penalty factor may be applied in combination with the above described embodiments in which segments within an area based on the polyline are favoured. In these embodiments segments within the area may be favoured by not having a penalty factor applied thereto, with segments outside the area being penalised to a variable degree with distance from the polyline.

Preferably a navigable segment is penalised to an extent that is based on a distance between the navigable segment and the polyline as represented on the electronic map. Thus, a penalty factor applied to the segment may be determined based on the distance between the navigable segment and the represented polyline. The degree to which a navigable segment is penalised is greater, the greater the distance between the navigable segment and the polyline as represented on the electronic map. Thus the penalty factor will be greater, the greater the distance between the navigable segment and the polyline. The degree to which a navigable segment is penalised may be proportional to a distance between the navigable segment and the polyline as represented on the electronic map, and most preferably to a square or higher order power of the distance.

The penalty factor applied to a segment, or the degree to which the segment is penalised, may take into account variation in the distance between the segment and the representation of the polyline along its length. For example, the penalty may be based upon an average distance between the segment and the polyline. This may be achieved in any suitable manner. In some preferred embodiments a segment is penalised to a degree that takes into account the distances between each of a plurality of different positions along the segment, and the representation of the polyline. In some preferred embodiments penalty factors are determined for each of a plurality of different positions along the segment, each being based upon the distance between the segment at the respective position and the representation of the polyline. The method may comprise determining a penalty factor for each of a plurality of positions along the segment, the penalty factor for each position being based upon a distance between the respective position and the polyline as represented on the electronic map, and using each penalty factor to derive an overall penalty factor to be applied to the navigable segment. The penalty factor for the segment may be obtained by combining penalty factors determined for each of the plurality of positions along the segment. For example, the penalty factors for each of the positions may be summed. Any reference to a position along the navigable segment may be in relation to the position along the actual navigable segment represented by the electronic map, or an approximation thereof. Where multiple positions along a navigable segment are taken into account, the spacing of the positions may be chosen as desired to provide a balance between accuracy in results and processing time and power required. For example, a closer spacing may be required where the segment has a more complex shape, e.g. as described using one or more shape points.

It will be appreciated that for processing efficiency, an approximation of the segment may be used to indicate the general position of the segment, e.g. ignoring detailed shape points along the length of the segment. Thus the distance between a navigable segment and the representation of the polyline may be based upon a distance between an approximation of the navigable segment and the representation of the polyline. For example, a navigable segment may be approximated by a straight line connecting the end nodes of the segment. In some embodiments a decision as to whether to use an approximation of the navigable segment or the actual course of the navigable segment when determining the distance may depend upon a complexity of a shape of the navigable segment and/or its relationship to the polyline. In these circumstances use of an approximation of the course of the navigable segment may be more likely to result in inaccurate determinations for the distance between the segment and the polyline. For example, where the projection of positions along a navigable segment on to the polyline extend over more than one segment of the polyline, intermediate shape points of the navigable segment may be taken into account.

While in preferred embodiments the respective distances between multiple positions along a segment and the representation of the polyline are considered in penalising the segment, e.g. determining a penalty factor, other arrangements are possible. For example, a segment may be penalised to an extent based upon a distance between a reference position along the navigable segment and the representation of the polyline, or a representative position indicative of the average position of the segment and the representation of the polyline, or similar.

The distance between a navigable segment, or a position thereon, and the polyline as represented on the electronic map may be measured in any suitable manner. The distance may be measured between the navigable segment, or position thereon, and a closest portion of the polyline. Preferably the distance is a projection of the segment or an approximation thereof, or a position on the segment or an approximation thereof, on the representation of the polyline.

The determination of a penalty factor for a segment, or where applicable for a position along the segment, may be dependent only upon the distance between the segment or position thereon and the polyline, or may take into account additional factors. The penalty factor for a navigable segment may be influenced by a level of resolution of the polyline or at least a part thereof. Preferably the penalty factor is greater, the greater the level of resolution of the polyline. One factor indicative of the level of resolution of the polyline is the length of the individual segments of the polyline relative to the overall length of the polyline. In some embodiments the penalty factor for a segment is influenced by the length of a segment of the polyline in proximity to the navigable segment. The segment of the polyline in proximity to the navigable segment is preferably the segment in relation to which the distance between the navigable segment, or position thereon, and the polyline is determined. For example, in some embodiments in which the distance between a segment, or position thereon, and the representation of the polyline is based upon a projection of the segment, or position thereon, and the polyline, the penalty factor for the segment or position thereon may additionally take into account a length of a segment of the polyline on to which the segment or position is projected. In some embodiments the penalty factor for a navigable segment or position thereon is inversely related to the length of a segment of the polyline e.g. the segment in proximity thereto. Thus, where the segment is relatively long, indicative of a coarse resolution of the polyline at least in that portion, the penalty factor would be smaller than in the case of a relatively short polyline segment. In this way, less weight is given to these portions of the polyline, such that the generated route is not attracted to a more coarsely resolved polyline or portion thereof to the same degree as to a more finely resolved polyline or portion thereof.

In some embodiments, the penalty factor for a navigation segment may be influenced by the proximity of the segment to an end of the polyline. In some embodiments the penalty factors applied to navigable segments closer to the ends of the polyline are relatively smaller than those applied to navigable segments closer to the middle of the polyline. Thus, for the same distance from the polyline, a navigable segment closer to the end of a polyline, e.g. that has a projection on to a segment of the polyline that is an end segment or within a given number of segments from the end segment of the polyline, or is within a given distance of the end of the polyline, will receive a penalty factor that is less than one that is toward the middle of the polyline e.g. that is not considered to be toward an end. This may result in a weaker attraction force to the polyline toward its ends, e.g. allowing a generated route to return to a specified first and second location for the route to be reconstructed where the polyline does not precisely extend between these points.

In the preferred embodiments in which a segment is penalised to an extent that is based upon the distance between the segment and the polyline, the polyline may act as a magnet, drawing the generated route back toward the representation of the polyline, but with a degree of attraction that increases with distance from the polyline. Thus, segments at a greater distance from the polyline will be penalised to a greater extent from those that are closer.

The route generated through the navigable network may be generated in a standard manner e.g. using a conventional routing engine, but additionally taking into account the polyline data. Thus, usual route planning preferences or settings may be retained, with the polyline data providing an additional input that is used, for example, to result in segments closer to the polyline being favoured over those further away. In some embodiments data indicative of a first and second location between which the route to be reconstructed extends may additionally be used. This is appropriate where the polyline does not itself extend between such locations. The first and second location data may be received, e.g. by a navigation device, for example together with polyline data, or may be otherwise known to the navigation device, e.g. where the route to be reconstructed was generated at its request. The method may comprise extending the polyline to the first and second locations for use in route reconstruction.

The route that is generated through the navigable network represented by the electronic map using the polyline data is a route between first and second locations. The first and second locations are preferably determined by reference to the polyline data. The route is preferably generated based upon a cost of traversing navigable segments of the navigable network. The cost of traversing a navigable segment may be determined using a cost function. Suitable cost functions are known in the art. The cost of traversing a segment may be determined based upon one or more attributes associated with the segment. Preferably the route is a least cost route through the navigable network. A least cost route may be based upon minimising a cost associated with traversing segments of the navigable network, which cost is determined using an appropriate cost function, i.e. which results in a lower cost being associated with segments that have an attribute that is deemed particularly desirable, or a higher cost associated with segments that are deemed undesirable. For example, the cost function may be selected as appropriate, e.g. based upon user input, to result in a least cost route that is a shortest route, fastest route, most ecological route, etc.

In preferred embodiments in which segments that are in greater proximity to the polyline are favoured for the purposes of route generation, the segments are preferably favoured by manipulation of the respective costs associated with traversing the segments of the network that are considered during route generation. This may be achieved by providing the segments that are favoured with a relatively lower cost than other segments at least in relation to a cost factor for the segment that is based on the proximity of the segment to the polyline and/or penalising other segments by providing them with a higher cost at least in relation to a cost factor for the segment that is based on the proximity of the segment to the polyline. In the preferred embodiments described above in which segments are penalised by applying a penalty factor thereto, the penalty factor is preferably used to provide a cost factor associated with traversing the segment that is taken into account in route generation, and which is based on the proximity of the segment to the polyline. Preferably the greater the penalty factor, the greater the cost factor based thereon. The penalty factor may be used directly or indirectly in providing the cost factor for traversing the segment that is based on the proximity of the segment to the polyline. The cost factor based on proximity of a segment to the polyline may be used in obtaining an overall cost for traversing the segment that is used in the route generation process, e.g. to obtain a least cost route. The cost factor may be used in a cost function to provide the overall cost for traversing the segment. Preferably the cost factor is one of a plurality of cost factors associated with the navigable segment that are used to obtain the overall cost for traversing the segment. In this way, route generation may balance the proximity of segments to the polyline with other factors to obtain a route that generally corresponds to the polyline, but which may also take into account other preferences, etc. The other cost factor(s) associated with segments are based upon one or more attributes of the segments. Attributes associated with segments which may be taken into account include the length, transit time, average speed of traversal, curvature or fuel consumption of the segments.

In some preferred embodiments the step of generating the route through the navigable network is carried out using "live" data. Live data as used herein in accordance with any of the aspects or embodiments of the invention refers to data which is relatively current and provides an indication of the relatively conditions in the network. The live data may typically relate to the conditions within the last 30 minutes, 15 minutes, 10 minutes or 5 minutes. "Historical" data, in contrast, refers to data that is not live, that is data that is not directly reflective of conditions in the network at the present time or in the recent past (perhaps within roughly the last five, ten, fifteen or thirty minutes).

The live data that may be used in accordance with the invention may be live data indicative of any factor or factors that may influence route selection in the navigable network under current conditions. The factor or factors may be any factors that will affect the flow of traffic along segments of the navigable network. The live data may comprise one or more of live traffic data, data indicative of road closures or data indicative of road works. In preferred embodiments the live data is data that has been received by a navigation device that carries out route construction from an external source, such as one or more servers. The use of live data is particularly useful in the context of reconstructing a pre-planned route. This enables a route to be pre-planned, e.g. by an external route planning system, and not necessarily immediately prior to departure, with the reconstruction by the navigation device being carried out at or around the intended time of departure in a manner that takes into account live conditions on the network. For example, there may be congestion or road closures that affect segments close to the polyline. The routing engine may then route around such segments as in a conventional route planning operation.

Although in preferred embodiments the method of generating the route using the polyline data involves favouring those segments of the electronic map that are in greater proximity to the polyline, the polyline data may be used in other manners. These techniques are particularly applicable to embodiments in which the route to be reconstructed is a pre-planned route that is to be travelled. This provides the ability to generate a route that generally conforms to the pre-planned route, but enabling other route planning preferences, and preferably live data, to be taken into account. In embodiments in which the route to be reconstructed is a previously travelled route, route reconstruction may proceed in a manner which attempts to more closely replicate the route represented by the polyline. The method may comprise the step of attempting to match each segment of the polyline to a navigable segment of the electronic map. The method may comprise obtaining and storing data indicative of the reconstructed route by reference to the electronic map. The data may be in the form of a list of segment identifiers or similar.

The methods of the present invention in any of its aspects or embodiments may be carried out in relation to one or more routes to be reconstructed. In some embodiments the methods are carried out in relation to a plurality of such routes.

The generated route that provides a reconstruction of the route represented by the polyline may be used in any desired manner. The method may comprise the step of storing data indicative of the generated route and/or outputting the route to a user. The method may extend to the step of carrying out one or more of: storing data indicative of the generated route; displaying the generated route; and generating and/or outputting a set of navigation instructions for guiding a user along the generated route. In embodiments in which data indicative of the generated route is stored, the data is preferably stored in association with the electronic map data. Likewise, displaying the generated route preferably comprises displaying the route on the electronic map.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GNSS (Global Navigation Satellite System), such as GPS (Global Positioning System), signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
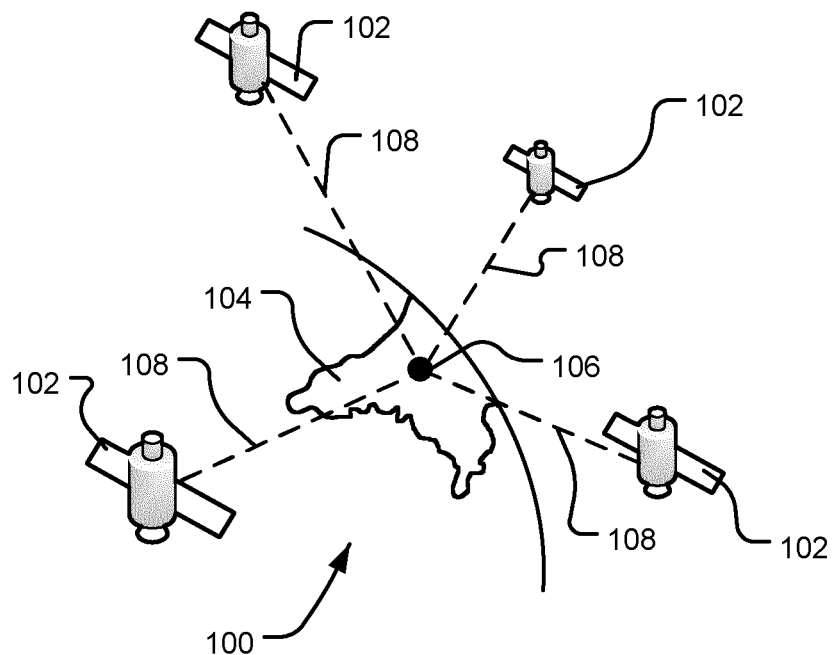
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
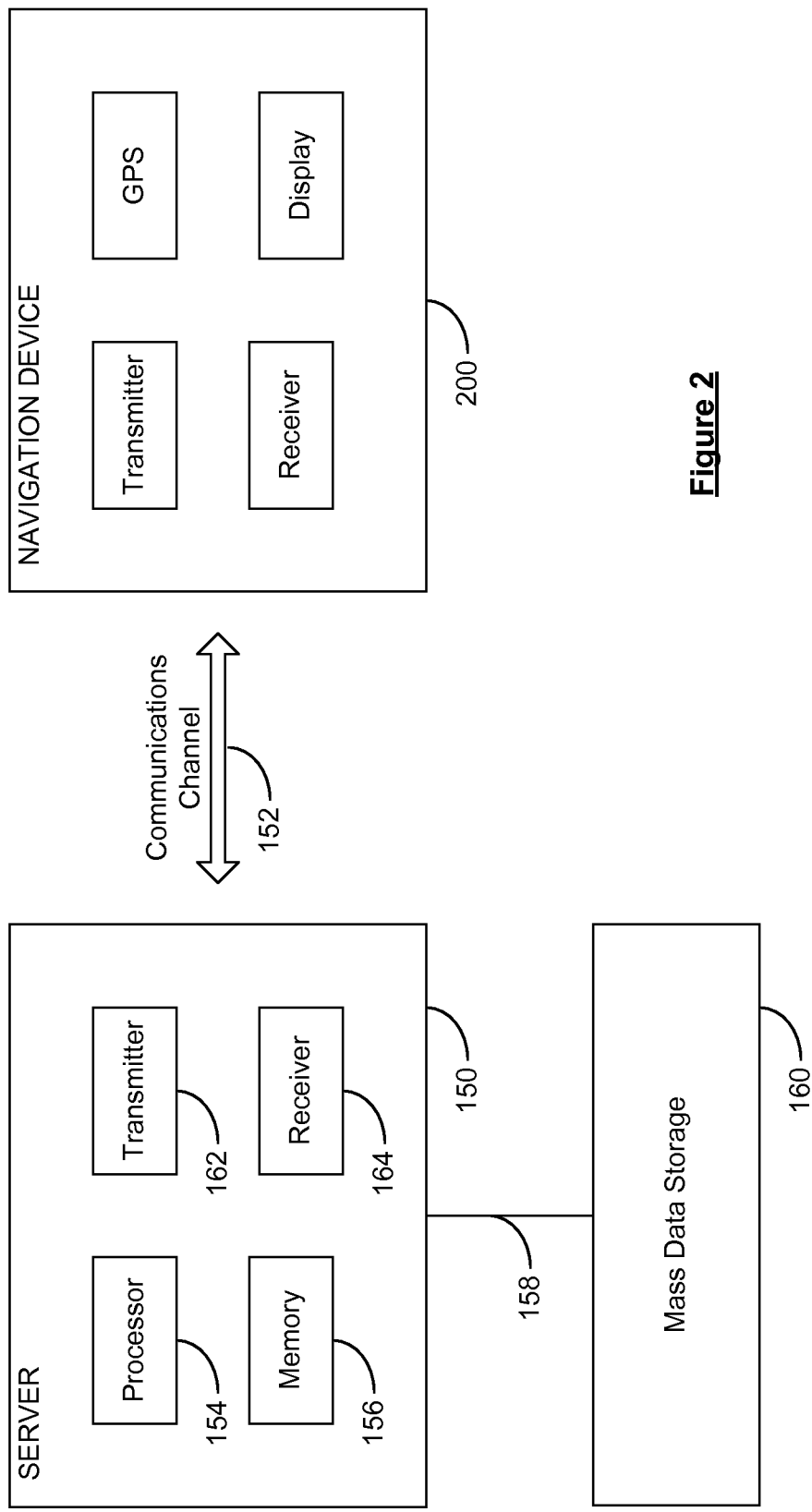
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
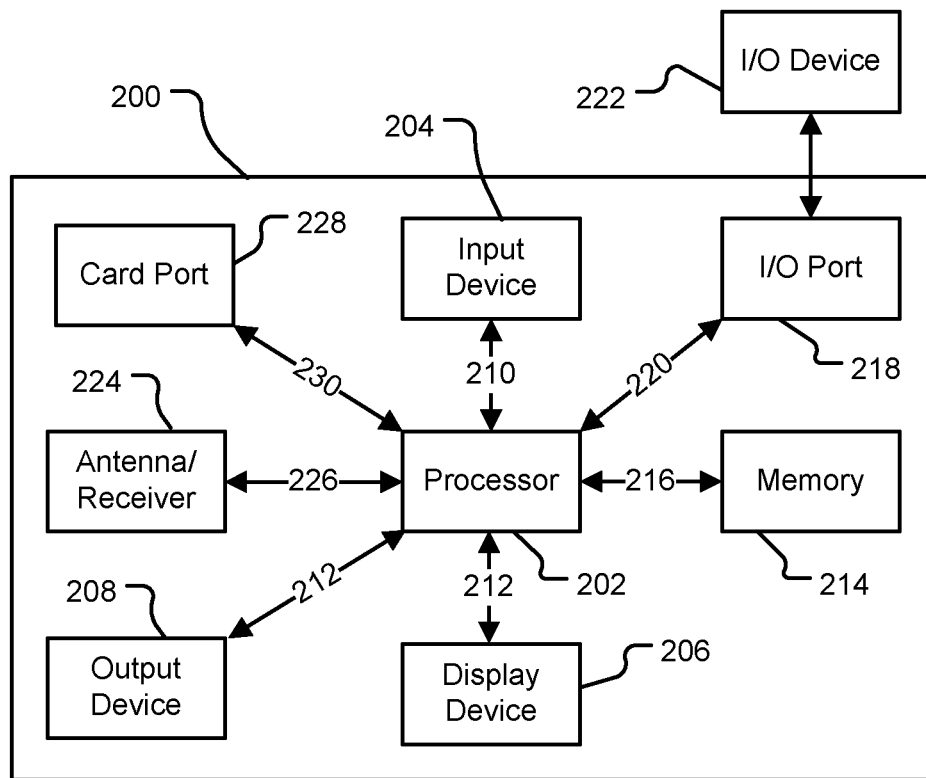
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or an input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
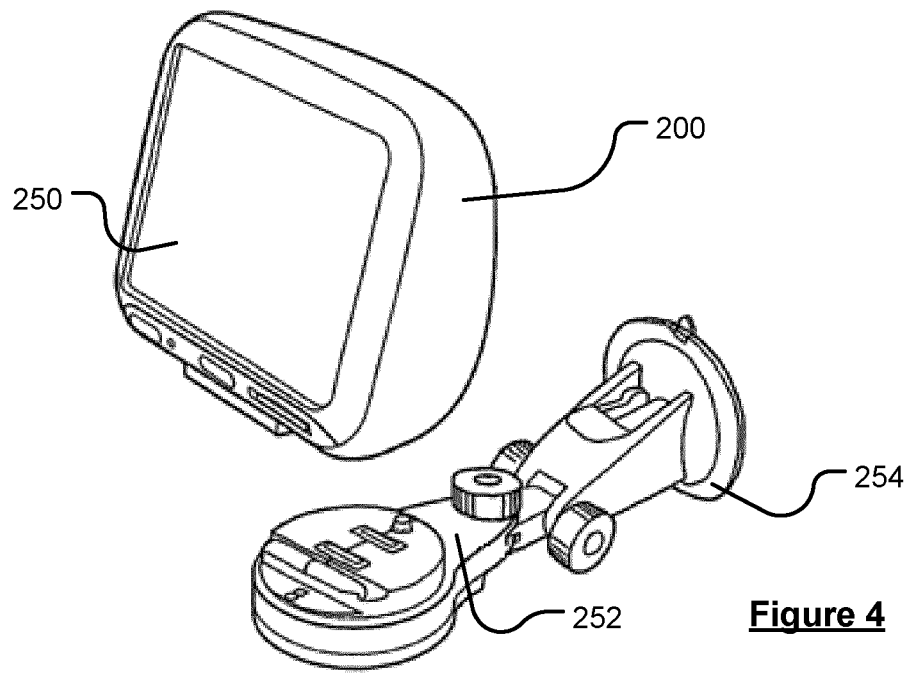
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case. Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts. The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data. As discussed above, the mass data storage 160 also contains map data. Such map data provides information about the location of road segments, points of interest and other such information that is generally found on map.

An embodiment of the invention will now be described by reference to FIGS. 5 and 6.

Figure 5:
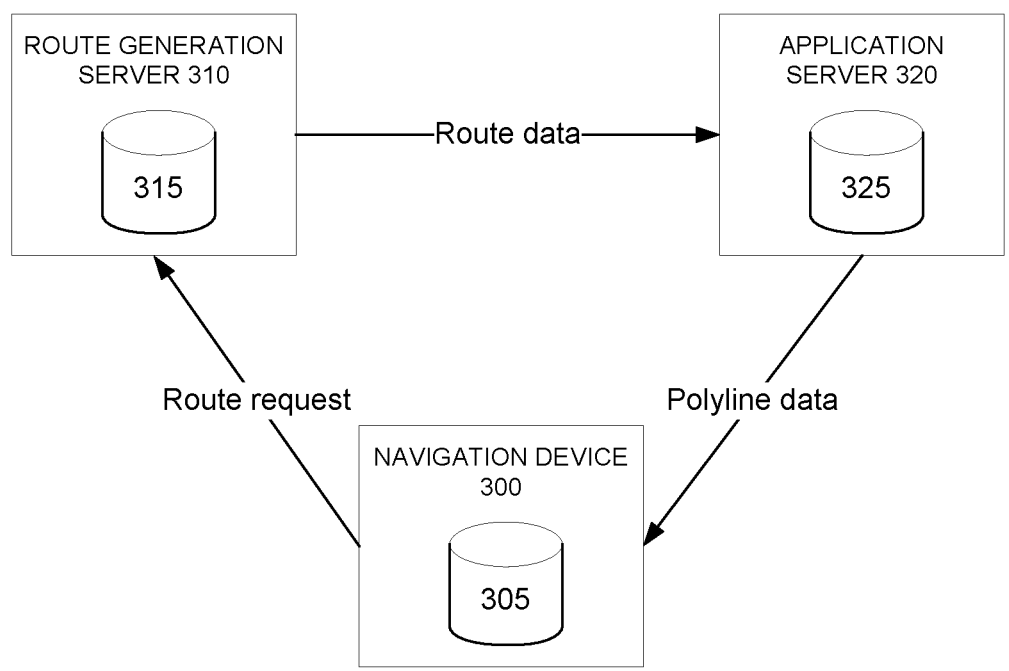
FIG. 5 illustrates a system which may be used to implement the methods of the invention in accordance with some embodiments.
Figure 6:
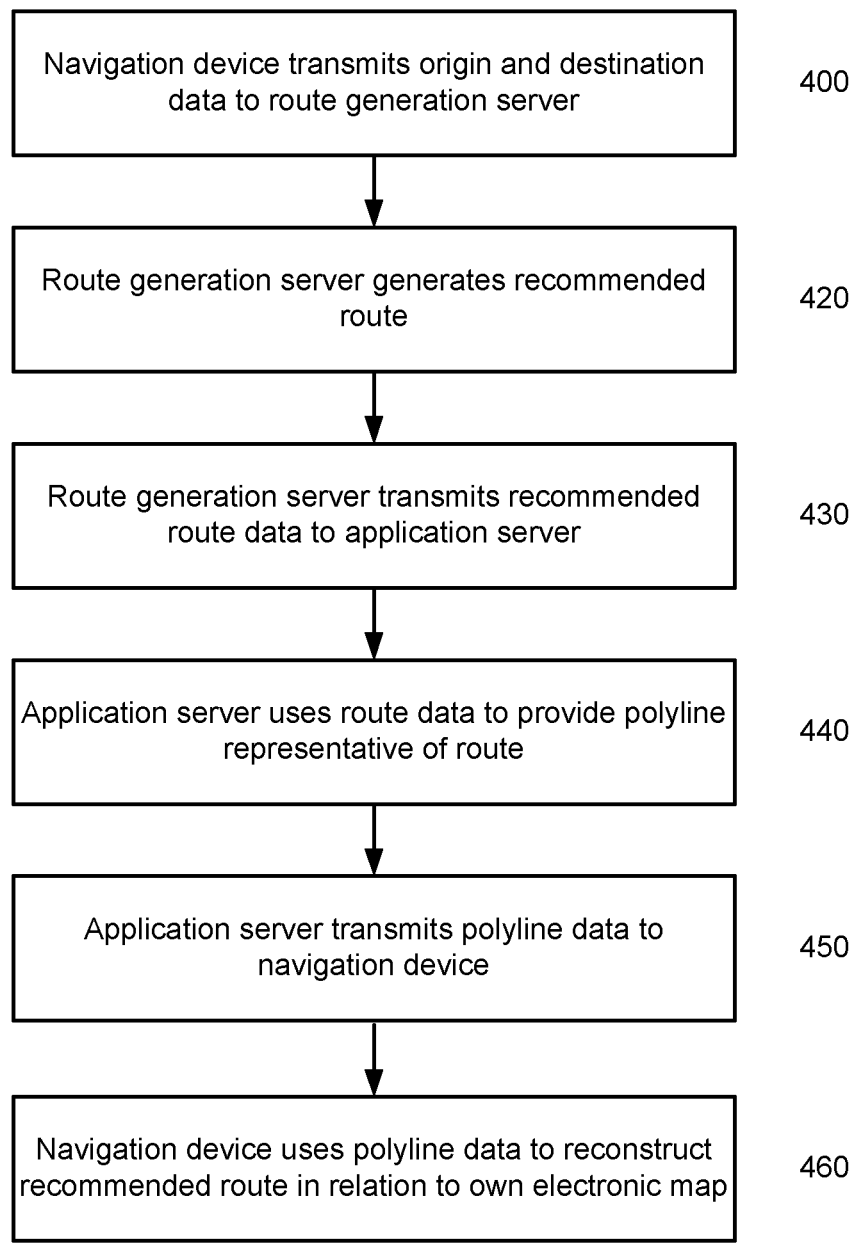
FIG. 6 is a flow chart outlining the steps of a method in accordance with one embodiment of the invention.

FIG. 5 illustrates an exemplary system that may be used to implement a method of reconstructing a route in accordance with one embodiment of the invention. The system includes a navigation device 300, which can be in the form of a PND or an integrated in-vehicle device. The navigation device stores electronic map data having a plurality of segments representing navigable segments of a navigable network in a given area (map database 305). The navigation device is in communication with a third party server that provides route planning functionality, route generation sever 310. The navigation device 300 may transmit details of a first and second location, and optionally other relevant information, to the route generation server 310, which may then generate a route between the locations on behalf of the device using map database 315. The route generation server 310 is in communication with an application server 320 which is used to implement the methods of the present invention. The application server 320 is able to take data indicative of the route generated by the route generation server 310, and generate data indicative of a polyline representative of the route using amp database 325, which is preferably then transmitted to the navigation device 300. Some or all of the digital map databases 305, 315 and 325 may be the same, i.e. comprise the same map data stored in the same map format, although in general the methods of the present invention, as discussed in more detail below, are applicable to embodiments in which the map databases 305, 315 and 325 are different, either in terms of the quality and/or quantity of the map data contained therein, and/or in terms of the format in which the map data is stored.

The steps of a method in accordance with an embodiment of the invention will now be described by reference to FIG. 6. At some point, the navigation device 300 needs to generate a route through the navigable network represented by the electronic map data 305, which can be used by the device, e.g. to be displayed to a user, and to provide a set of navigation instructions for guiding the user along the route. The invention will be described by reference to the situation in which the navigation device needs to generate a route through the navigable network between an origin and a destination that are specified by a user. However, the invention is applicable to the generation of a route between any first and second locations which may be required by the navigation device for any reason, where one or both of the first and second locations may be determined by the navigation device or a user. For example, the first location may be a current location of the device.

The navigation device 300 transmits data indicative of the origin and destination of the required route to the route generation server 310—step 400. Additional information may be transmitted if desired to be used in route planning. The route generation server 310 then generates a recommended route between the specified origin and destination—step 420. This recommended route will be in relation to electronic map data 315 of the server. This map data may not be the same as the electronic map data of the navigation device. The route generation server 310 then transmits data indicative of the recommended route ("route data") to the application server 320—step 430. It will be appreciated that instead, the functions of the route generation server 310 and the application server 320 might be combined, so as to be provided by a single server. However, by separating these functions, a third party route generation server may be used. The route data can be transmitted from the route generation server 310 to the application server 320 in any suitable form, although typically, as the map databases 315 and 325 will be different, the route data is transmitted in a map agnostic format, e.g. as a location reference encoded using a system such as OpenLR™, AGORA-C and TPEG-ULR. Typically, these dynamic location referencing techniques with encode the recommended route by referencing nodes within a first digital map (e.g. map database 315) by their geographic coordinates, together with certain attributes of segments therebetween. This information can then be decoded or resolved on a second, different digital map (e.g. map database 325) to determine the equivalent location within the second digital map. Of course, the route data can be transmitted in other forms such as in the form of an ordered list of segment or node identifiers, e.g. in circumstances when the map databases 315 and 325 are the same.

The application server 320 receives the route data that is indicative of the recommended route, and converts the route data into a polyline representative of the route—step 440. The polyline data that is generated is indicative of a polyline in the form of a plurality of points connected by lines. For example, the data may be in the form of an ordered list identifying the points which are connected by the line segments in the polyline. The points may be defined in terms of latitude and longitudinal coordinates. The points may be spaced between 20 and 100 metres apart; so as to optimum processing efficiency. The polyline may take over forms, such a series of connected line segments, or as an ordered list of distances and bearings from a starting location (with each distance and bearing indicating the next line segment of the polyline).

The polyline need not exactly replicate the route. The polyline may be a generalisation of the route. For example, the number of points in the polyline may be reduced compared to a number of points between segments of the route that it represents, and/or initial polyline data may be subjected to a generalisation process to reduce the number of points, e.g. coordinates it includes. Thus the polyline is representative of the route in that it is at least similar thereto, and may be an approximation of the route.

Once the polyline has been generated, the application server 320 transmits the polyline data to the navigation device—step 450. The polyline data may be transmitted as an XML file.

The navigation device 300 receives the polyline data, and uses the data to reconstruct the route represented by the data in relation to its own electronic map data 305—step 460. The navigation device does this by carrying out a normal route generation process between the origin and destination, but taking into account the polyline data. This is done in a manner such that those segments in closer proximity to the polyline as represented by the electronic map data of the device are favoured for the purposes of route generation over those at a greater distance from the polyline. This may be achieved by applying a penalty factor to navigable segments of the electronic map for the purposes of the route generation based upon their distance from the polyline. Those segments which are further from the polyline are ascribed a higher penalty than those closer to the polyline. Penalty factors may be applied to all segments based upon their proximity to the polyline, or starting only from segments at a given distance from the polyline, e.g. which lie outside an area based on the polyline. The penalty factors applied to segments preferably increase in a continual manner with increasing distance from the polyline. However, it is envisaged that other arrangements may be used, e.g. a stepped increase, or single penalty level for segments outside an area close to the polyline.

A least cost route is then generated through the network represented by the electronic map, e.g. using conventional graph search techniques, such as the well-known Dijkstra's algorithm, but wherein the cost values associated with traversing segments are adjusted or determined depending upon the proximity of the segments to the polyline. However, the cost for traversing a segment will also include contributions based on other factors that are to be considered in route generation e.g. traversal time for the segment, length of segment, curvature, etc.

It will be appreciated that the navigation device 300 will carry out a step of representing the polyline on its electronic map. This may be achieved by matching the coordinates defining the polyline to locations representing the coordinates according to the electronic map data. The segments of the polyline may not correlate to segments of the electronic map. However, this does not prevent the polyline being used to carry out route generation in a manner which favours those segments of the electronic map closer to the polyline.

In this way, the resulting generated route will tend to be attracted to the polyline. However, it is not compelled to try to replicate the polyline. This means that there is freedom to take into account other route planning preferences, or "live" data, which might result in segments being more appropriate for inclusion in the route than those closest to the polyline. The route generation advantageously takes into account live data, e.g. relating to traffic along segments, closures affecting segments, diversions, roadworks, etc. This may be obtained by the navigation device 300 from any suitable source, e.g. a traffic server. In this way, the resulting route that is generated is based upon the recommended route generated by the route generation server 310, but taking into account current conditions in the road network. The route is not compelled to include segments that are close to, or on the polyline, if those segments are closed, or subject to heavy traffic, etc.

Of course, the polyline data may be used in other manners such that segments closer to the polyline will be favoured in route generation. For example, an area may be defined around the polyline as represented by the electronic map data, with the route generation process considering only navigable segments within that area. A fixed penalty factor may be applied to segments outside the area, or one that varies so that segments are assigned a higher penalty the further they are from the polyline.

Once the navigation device has reconstructed the route in relation to its own electronic map data, it may use the route in any suitable manner, and may display the route and/or generate a set of navigation instructions to guide a user along the route.

In the preferred embodiment described above, it will be seen that the present invention provides an improved hybrid routing system, in which server side route generation and client side route reconstruction are decoupled.

While the invention has been described in relation to a system in which a server generates the route in response to a request by a navigation device, it is not necessary that the route data that is used to obtain the polyline data is obtained in this manner. A polyline representative of a route may be obtained, and provided to a navigation device for reconstruction of the route, based upon any data indicative of a route, which may be obtained from various sources. For example, the route may be a route generated by interaction of a user with a route planning website. A route may be planned in this manner, and a polyline determined some time before departure, with the polyline then being used by the navigation device to reconstruct the route, taking into account live data, immediately prior to departure.

While the invention has been described in relation to an embodiment in which a server determines the polyline data using route data, it is envisaged that this step may be carried out by the navigation device. For example, a user may provide suitable route data as an input to the navigation device, or the navigation device may receive such data, e.g. from a route generation server or other system. The navigation device may then be arranged to use the route data to obtain polyline data indicative of the route as described above in relation to embodiments in which the application server 320 carries out such a step.

In the embodiment described above, the navigation device stores its own electronic map data prior to initiating the route generation process, which data is subsequently used in route reconstruction. In other embodiments it is envisaged that the navigation device may not store full electronic map data for a given area. Instead, the navigation device may receive relevant electronic map data from a server as required. Electronic map data relating to a region around a current position of the device may be transmitted to the device by a server on an intermittent basis, so that the device always has electronic map data that is likely to be required in the immediate future. The navigation device may provide a "heartbeat" type signal, indicative of a current position to a server, which may then provide the relevant electronic map data based upon the current position of the device. Alternatively or additionally, where the navigation device initiates a route generation process, electronic map data relevant to the routing process may be transmitted to the device from a server, automatically or in response to a request by the navigation device.

For example, if the navigation device requires a route to be generated, the navigation device may transmit an origin, which may be a current position, and a destination for the route. The method may then proceed in a manner along the lines of FIG. 5, with a server generating a route, and the route data being used to obtain polyline data. However, in addition to transmitting polyline data to the navigation device, electronic map data required by the navigation device for route reconstruction, selected based upon the current position and/or the generated route, i.e. electronic map data in respect of a routing corridor, is additionally made available e.g. transmitted to the navigation device. The navigation device may then reconstruct the route in relation to obtained electronic map data as described above. However, the electronic map data is the data that will have been received and stored by the navigation device as part of the route generation process, and relating to an area corresponding to a routing corridor, rather than a full electronic map that was held by the device prior to requesting a route.

It is envisaged that route reconstruction based upon polyline data in accordance with the invention in any of its aspects may or may not be carried out by a navigation device. Instead, the functions performed by navigation device 300 in the embodiments described above may be performed by any device, including a server, whether implemented in software or hardware, which has access to electronic map data, and has route generating capability, whether or not it additionally provides navigation functionality.

The way in which segments of an electronic map closer to the representation of the polyline on the map may be favoured in route reconstruction in accordance with certain embodiments of the invention will now be described A penalty factor is applied to segments considered in the route (or graph) search algorithm dependent upon their distance from the polyline. The greater the distance between a segment and the polyline, the greater the penalty factor applied to the segment. The penalty factor gives rise to a cost attributable to the distance of the segment from the polyline which is taken into account when determining a least cost route through the network between the origin and destination, with a higher penalty factor for a segment resulting in a higher cost contribution. In this way, when generating a route, the route will tend to conform to the general form of the polyline. Furthermore, if a vehicle deviates from the reconstructed route, i.e. the recommended route, and it is necessary to regenerate a route to return the vehicle to the recommended route, the level of "attraction" pulling the vehicle back to the recommended route close to the polyline will increase, the further the vehicle moves from the recommended route.

One example of the way in which penalty factors may be applied to segments of an electronic map dependent upon their distance from the polyline as represented on the map during route reconstruction will now be described in more detail.

The method is used to determine a penalty factor that is associated with a contribution to the cost of traversing a navigable segment during the usual route generation process e.g. to provide a least cost route through the network between the origin and destination. The penalty factor, and hence the cost contribution, is attributable to, and dependent upon, a distance between the navigable segment and the polyline. This will provide a contribution to the cost of traversing the segment according to the cost function that is used. Other contributions to the cost may be based upon any other factors that are desired to be taken into account, e.g. travel time for traversing the segment, segment length, etc.

The penalty factor is obtained by consideration of a number of points along the length of the navigable segment, or an approximation thereof. For example, to simplify processing, a navigable segment may be treated as a straight line connecting its end points, such that intermediate shape points are ignored. In other arrangements intermediate shape points may be taken into account. For example, where more than one vertex of the polyline exists between the projection of the first and second ends of a navigable segment upon the polyline, intermediate shape points of the segment may be taken into consideration. This may help to ensure that the generated reconstructed route will tend to follow the polyline even where it makes a tight loop.

The following steps are performed for each point along the segment or approximation thereof that is considered. The point is projected onto the polyline. A penalty factor for that point is derived which is proportional to the square of the distance between the point and its projection on to the polyline. Of course, on other embodiments, the penalty factor may be proportional to the cube of the distance between the point and its projection onto the polyline, or to any other power as desired. An overall penalty factor for the segment is derived by summing the penalty factors associated with individual points along the length of the segment or approximation thereof. In preferred embodiments this is achieved by integration. This overall penalty factor is then used to provide a cost contribution based on the distance of the segment and the polyline for use in route generation.

In other words, during the route search, an additional "friction loss penalty" is added to the usual propagation cost on each arc (travel time, path length, etc depending on the objective function). The "friction loss" is calculated as an integral of the "friction force" over the arc, where the magnitude of the force is proportional to the square of the distance between the point on the arc and its projection on the prescribed polyline. You can think of a rubber string attached to a small carriage sliding on rails along the polyline. The further from the rails you are walking, the tighter becomes the string and the harder for you to walk.

The penalty factor derived for a given point may take into account additional factors. In some optional arrangements, the magnitude of the penalty factor may take into account a length of the polyline segment that the point is projected on to. For example, it may be quadratically reciprocal to the Euclidian length of the segment. This would mean that the longer the polyline segment, the smaller the penalty factor, such that for the same distance from the polyline, a segment would be penalised to a lesser degree where the polyline has relatively longer segments, i.e. is coarser. In this way, deviation from a coarser polyline may be penalised to a lesser extent. In other optional arrangements, different segments of the polyline may be assigned different relative weights, such that a penalty factor derived for a navigable segment associated with points that project on to one segment may differ from that derived for a navigable segment associated with points that project on to a different segment.

When determining the projection of a given point along a segment on to the polyline, path history may be taken into account. In this way, it may be ensured that a projection point may never go backward toward the origin of the polyline.

In some cases the polyline may be extended to the origin and destination of the route prior to carrying out route reconstruction if they do not lie on the polyline. This may also be carried out in relation to any way points. Rather than extending the polyline to an origin and destination if they do not lie on the polyline, should an orthogonal projection from the origin or destination point to a segment of the polyline exist, then a penalty factor may simply be derived for this projection, even though it does not correlate to the origin or destination. The magnitude of the penalty factor determined in respect of segments, or points thereon, that are projected on to the end portions of the polyline may be reduced relative to that determined for points that project on to intermediate portions of the polyline. This may allow for smoother approaches to the origin and destination.

While the embodiments of the invention have been described by particular reference to the case in which the route to be reconstructed is a previously planned route, that is yet to be navigated, it has been found that the techniques described herein, involving the use of a polyline, may be equally useful in reconstructing a route that has previously been travelled, e.g. by a navigation device. One such embodiment will now be described by way of example, and by reference to FIGS. 7, 8A, 8B and 8C.

Figure 7:
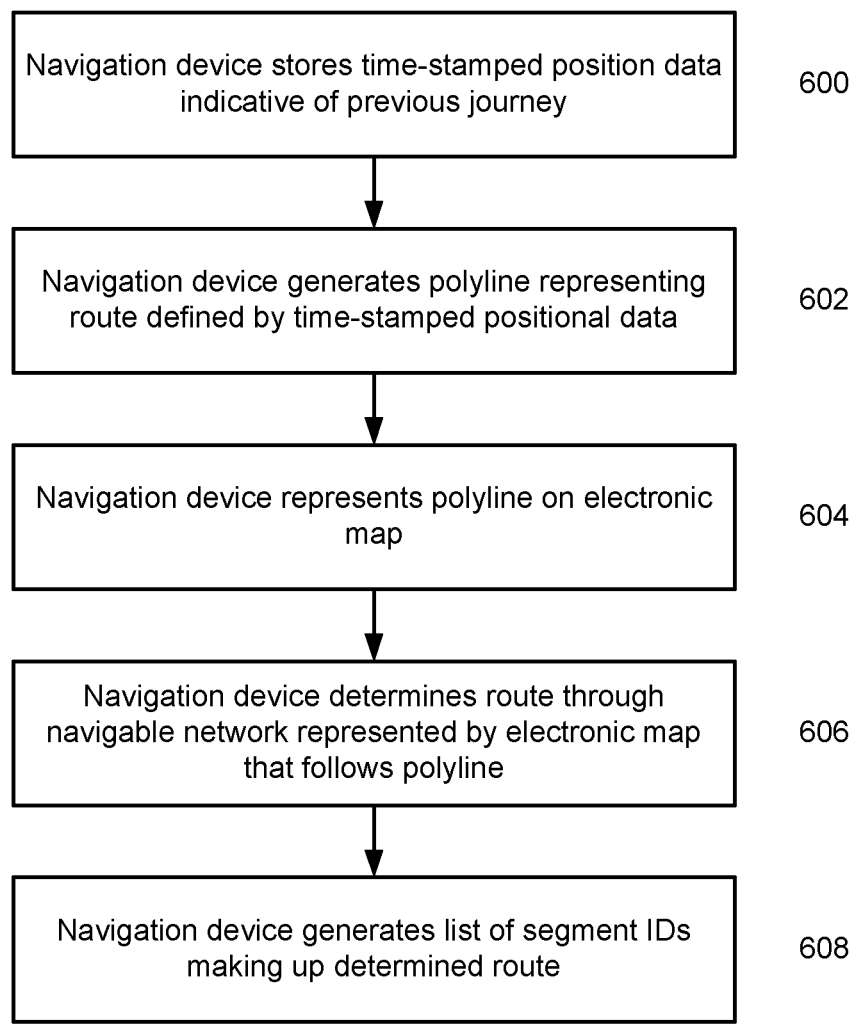
FIG. 7 is a flow chart outlining the steps of a method in accordance with another embodiment of the invention.
Figure 8A:
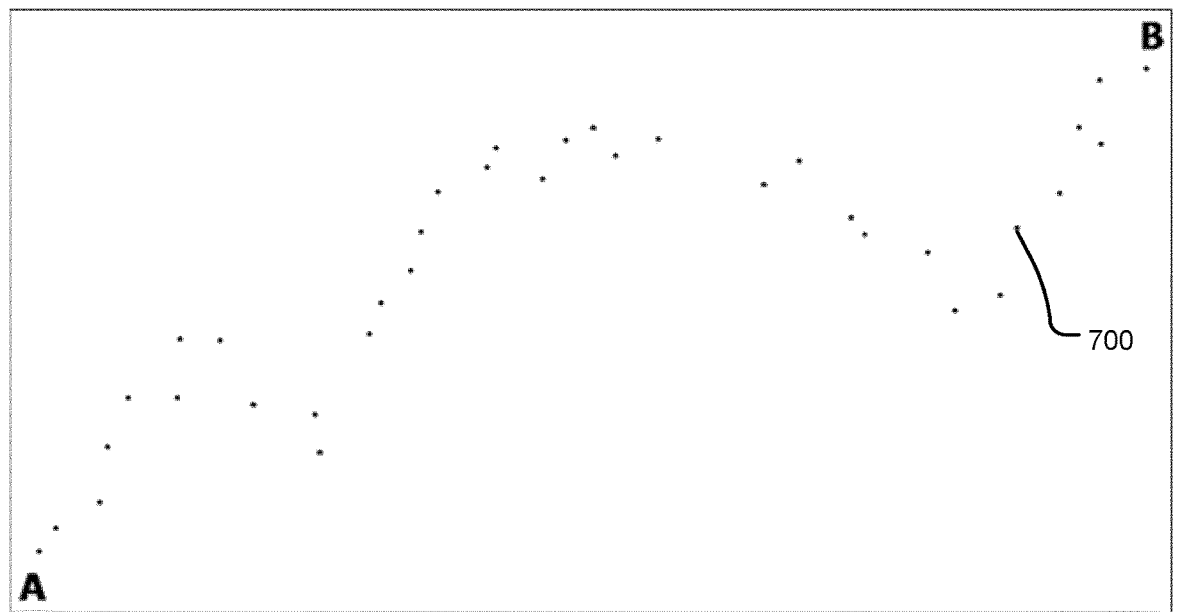
FIG. 8A illustrates a set of time-stamped GPS data that may be used to implement one embodiment of the invention.

In step 600 of FIG. 7, a navigation device stores time-stamped positional data indicative of a journey made between a given start point and end point. The positional data is in the form of GNSS data or similar, i.e. a plurality of geographical coordinates (e.g. latitude and longitude) having associated temporal data indicating the time the device was at that position. Thus, it is not by reference to any particular electronic map. The device may collect the data during travel along the route by a vehicle with which the device is associated. FIG. 8A illustrates such data 700 representative of a journey between points A and B.

At a later time, it may be desired to reconstruct this previously travelled route in relation to the electronic map data of the device at that time. For example, it may be desired to provide navigation instructions to guide a user along the route, or to display the route. In order to do this, the device generates a polyline representative of the route defined by the time-stamped positional data—step 602. The polyline generally follows the route as indicated by the positional data. The polyline data may be in the form of a list of coordinates defining the points which are connected by line segments to provide the polyline as in the earlier embodiments.

Figure 8B:
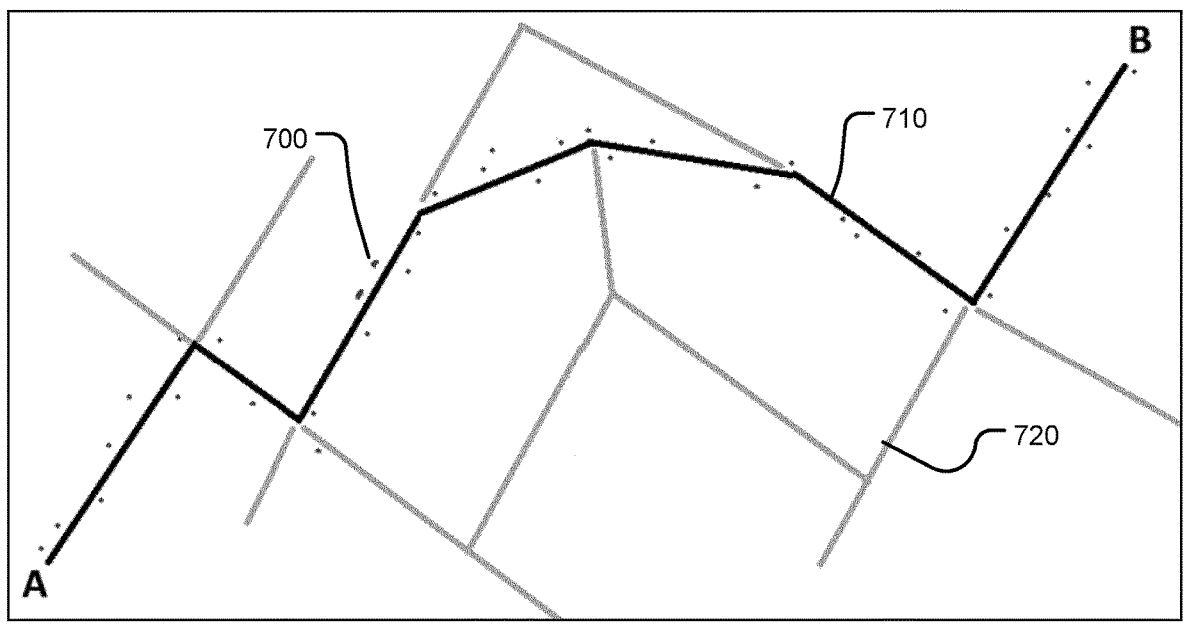
FIG. 8B illustrates the reconstruction of the route described by the time-stamped GPS data of FIG. 10A through a navigable network.

In step 604 the device represents the polyline on its electronic map data. The device then generates a route through the navigable network represented by the electronic map between A and B, which follows the polyline as closely as possible—step 606. This may be carried out in any suitable manner, e.g. by penalising navigable segments which are at a greater distance from the polyline as discussed in the earlier embodiments. In contrast to the earlier embodiment which seeks to use the polyline merely as a guide in route construction, the aim in these further embodiments is to obtain a route that matches the polyline as far as possible. Thus, typically other routing considerations that might result in routing away from the polyline will not be taken into account. FIG. 8B illustrates a route 710 that may be generated in this way through a navigable network represented by an electronic map made up of segments 720 superimposed on the positional data 700.

Figure 8C:
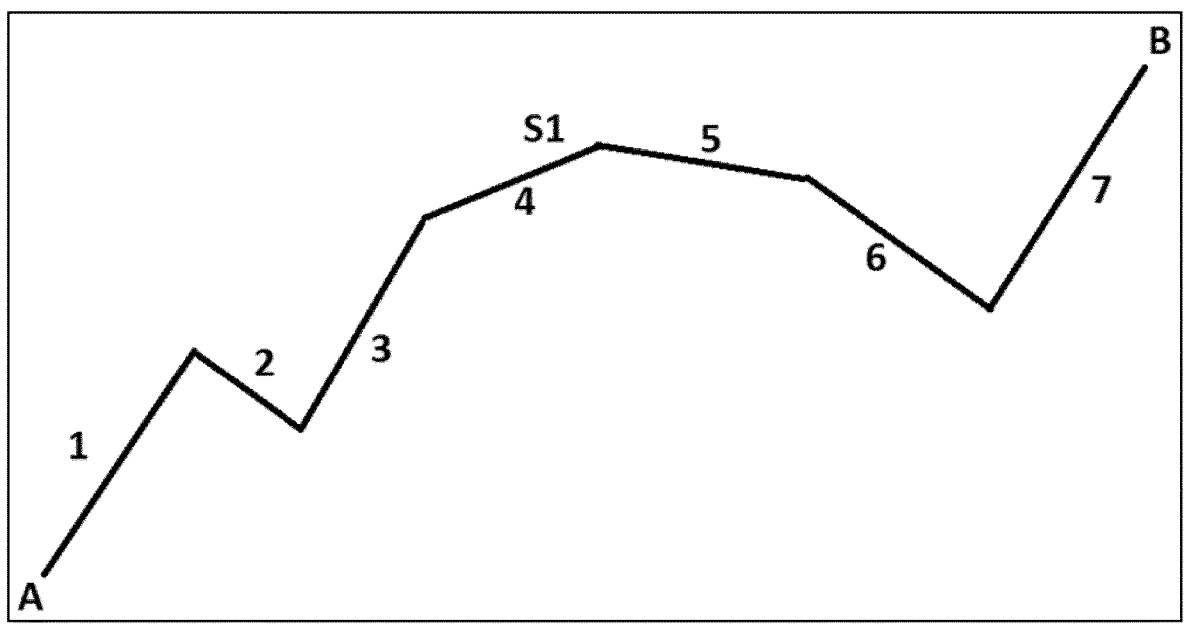
FIG. 8C illustrates the segments of an electronic map which correspond to the reconstructed route.

The device generates a list of the segment IDs which make up the determined route—step 608. FIG. 8C illustrates a list of segments 1-7 along a stretch S1 forming a generated route between A and B, which follows a polyline based on the positional data representing the journey between A and B. In this way, by storing a previously travelled route in the form of time-stamped positional data, and then reconstructed the route in relation to electronic map data using a polyline, it is possible to accurately reconstruct the route, even where the electronic map data of the device has been updated since the route was first travelled. This is because the initially travelled route is recorded in terms of positional data, rather than by reference to a particular electronic map.

Of course these techniques may be applied to reconstructing a previously travelled route that was travelled by another device, not necessarily the navigation device that reconstructs the route, provided that suitable positional data indicative of the route may be provided to the device that is to perform reconstruction. In addition, the reconstruction need not be performed by a PND, but may be performed by any device with route planning, and optionally navigation functionality.

One example of the data indicative of the previously travelled route that may be used in these further embodiments is as follows. The time-stamped positional data is stored in a database in conjunction with basic details of the route, i.e. a route identifier, time travelled, origin and destination points. The basic details of the route may be as follows:

| Route | Time of Day | Day of week | From | To |
|---|---|---|---|---|
| R1 | 10:30 | Wednesday | A | B |

The detailed time-stamped positional data associated with the route details may indicative of a positional trace or similar, as shown in FIG. 8A. One example of such positional data would be;

| Route | Sequence | Point |
|---|---|---|
| R1 | 1 | 52.12735, 4.89283 |
| R1 | 2 | 52.12755, 4.89291 |
| R1 | 3 | 52.12799, 4.89392 |
| R1 | 4 | 52.12801, 4.92274 |
| R1 | 5 | 52.12892, 4.93043 |
| R1 | 6 | 52.12163, 4.94377 |
| R1 | etc | etc |

This positional data lists the coordinates of each point of the route in sequence. The points are equally spaced in time, with a known interval.

In this way, a database comprising traces in respect of a number of previously travelled routes may be built up, and stored, for example, by a navigation device. When it is desired to reconstruct a particular route in relation to a given electronic map, a device may simply access the relevant GPS data for the route, and reconstruct the route using a polyline as described above. This may be repeated for multiple routes. For example, a database of GPS information indicative of previously travelled routes may be converted into a database of routes, this time by reference to an electronic map.

In the example given above, and illustrated in FIGS. 8A-C, the data indicative of the reconstructed route R1 in relation to an electronic map might be defined by the following route overview and details of the segment IDs included in the route:

| Route | Time of Day | Day of week | From | To | Stretch |
|---|---|---|---|---|---|
| R1 | 10:30 | Wednesday | A | B | S1 |

| Stretch | Sequence | Segment ID |
|---|---|---|
| S1 | 1 | 8271346 |
| S1 | 2 | 8271347 |
| S1 | 3 | 8271352 |
| S1 | 4 | 8271392 |
| S1 | 5 | 8273343 |
| S1 | 6 | 8272167 |
| S1 | 7 | 8272735 |

The previously travelled routes in these further embodiments might be, for example, commuter routes, or other routes that may be travelled.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of reconstructing a route through a navigable network in an area covered by an electronic map, the electronic map comprising a plurality of segments representing navigable segments of the navigable network, the method comprising:
   obtaining data indicative of a polyline representative of a route through the navigable network, which route is to be reconstructed in relation to the electronic map, the data indicative of the polyline comprising a list of first points and/or segments that directly or indirectly identify second points and segments of the polyline; and
   using the obtained data indicative of the polyline in generating a route through the navigable network as represented by the electronic map, wherein the generated route provides a reconstruction of the route represented by the polyline through the navigable network in relation to the electronic map, and wherein the generating of the route comprises:
      favouring segments of the electronic map for inclusion in the generated route that are in greater proximity to the polyline as represented on the electronic map;
      penalising segments of the electronic map for the purposes of route generation to a degree which depends upon the proximity of the respective segments to the polyline as represented on the electronic map, wherein those segments that are further from the polyline are penalised to a greater degree than those that are closer to the polyline; and
   using live data indicative of the current conditions of the navigable network in the generation of the route such that the route is able to deviate from the route represented by the polyline, wherein the live data comprises one or more of live traffic data, data indicative of road closures, and data indicative of road works, and wherein deviating from the route includes adjusting one or both of the favouring and penalizing so that segments of the electronic map that are further from the polyline are more likely to be included in the generated route instead of segments of the electronic map that are in greater proximity to the polyline based on the one or more of the live traffic data, the data indicative of road closures, and the data indicative of road works.

2. The method of claim 1, comprising defining an area based on the polyline as represented on the electronic map, and favouring those segments of the electronic map which are considered to be within the area for the purposes of route generation.

3. The method of claim 1, wherein segments are penalised by applying a variable penalty factor thereto depending upon distance of the segment from the polyline.

4. The method of claim 3, wherein the penalty factor applied to segments varies in proportion to a square of the distance between a segment and the polyline.

5. The method of claim 1, wherein segments are penalised by applying a penalty factor thereto, the penalty factor being used to provide a cost factor associated with traversing the segment that is taken into account in route generation.

6. The method of claim 1, wherein generating the route to provide a reconstruction of the route represented by the polyline comprises generating a least cost route through the navigable network.

7. The method of claim 1, wherein obtaining the data indicative of the polyline and using the obtained data in generating the route through the navigable network as represented by the electronic map are performed by a navigation device, the navigation device storing data indicative of the electronic map.

8. The method of claim 7, wherein the route to be reconstructed is an pre-planned route generated off-board from the navigation device, wherein the route is planned by a server in response to a request by the navigation device.

9. The method of claim 1, further comprising using data indicative of the route through the navigable network to be reconstructed to generate the data indicative of the polyline representative thereof.

10. The method of claim 1, wherein the route to be reconstructed is a pre-planned route between a first location and a second location.

11. The method of claim 7, wherein the route to be reconstructed is a previously travelled route through the network.

12. The method of claim 11, further comprising obtaining positional data and associated timing data indicative of the travelled route, and using the data to generate the data indicative of the polyline representative of the route.

13. The method of claim 12, wherein the navigation device obtains the positional data and associated timing data, and using the data to generate the polyline data, wherein the previously travelled route is a route travelled by the navigation device.

14. The method of claim 13, comprising the navigation device storing data indicative of a plurality of routes previously travelled by the device through the navigable network in the area covered by the electronic map of the device, and, for each route, using the previously travelled route data to generate data indicative of a polyline representative of the route, using the obtained data indicative of a polyline to generate a route through the navigable network as represented by the electronic map, the generated route providing a reconstruction of the route represented by the polyline, and storing data indicative of the reconstructed route.

15. The method of claim 1, wherein obtaining the data indicative of the polyline comprises receiving the data over a wireless communications link.

16. The method of claim 1, wherein the received polyline data is associated with the electronic map data for use in reconstruction, or data which may be used to retrieve the electronic map data, the method further comprising receiving and storing the electronic map data for use in route reconstruction.

17. The method of claim 1, further comprising outputting the generated route to a user and/or providing a set of navigation instructions for guiding a user along the route.

18. A routing system for reconstructing a route through a navigable network in an area covered by an electronic map, the electronic map comprising a plurality of segments representing navigable segments of the navigable network, the system comprising:
  a processor;
  a memory, wherein the memory stores the electronic map;
  wherein the processor is operable to:
    obtain data indicative of a polyline representative of a route through the navigable network, which route is to be reconstructed in relation to the electronic map, the data indicative of the polyline comprising a list of first points and/or segments that directly or indirectly identify second points and segments of the polyline; and
    use the obtained data indicative of the polyline in generating a route through the navigable network as represented by the electronic map, wherein the generated route provides a reconstruction of the route represented by the polyline in relation to the electronic map, and wherein the generating of the route comprises:
      favouring segments of the electronic map for inclusion in the generated route that are in greater proximity to the polyline as represented on the electronic map;
      penalising segments of the electronic map for the purposes of route generation to a degree which depends upon the proximity of the respective segments to the polyline as represented on the electronic map, wherein those segments that are further from the polyline are penalised to a greater degree than those that are closer to the polyline; and
      using live data indicative of the current conditions of the navigable network in the generation of the route such that the route is able to deviate from the route represented by the polyline, wherein the live data comprises one or more of live traffic data, data indicative of road closures, and data indicative of road works, and wherein deviating from the route includes adjusting one or both of the favouring and penalizing so that segments of the electronic map that are further from the polyline are more likely to be included in the generated route instead of segments of the electronic map that are in greater proximity to the polyline based on the one or more of the live traffic data, the data indicative of road closures, and the data indicative of road works.

19. A non-transitory computer readable medium which stores a set of instructions which when executed performs a method for reconstructing a route through a navigable network in an area covered by an electronic map, the electronic map comprising a plurality of segments representing navigable segments of the navigable network, comprising:
  obtaining data indicative of a polyline representative of a route through the navigable network, which route is to be reconstructed in relation to the electronic map, the data indicative of the polyline comprising a list of first points and/or segments that directly or indirectly identify second points and segments of the polyline; and
  using the obtained data indicative of the polyline in generating a route through the navigable network as represented by the electronic map, wherein the generated route provides a reconstruction of the route represented by the polyline through the navigable network in relation to the electronic map, and wherein the generating of the route comprises:

favouring segments of the electronic map for inclusion in the generated route that are in greater proximity to the polyline as represented on the electronic map;

penalising segments of the electronic map for the purposes of route generation to a degree which depends upon the proximity of the respective segments to the polyline as represented on the electronic map, wherein those segments that are further from the polyline are penalised to a greater degree than those that are closer to the polyline; and using live data indicative of the current conditions of the navigable network in the generation of the route such that the route is able to deviate from the route represented by the polyline, wherein the live data comprises one or more of live traffic data, data indicative of road closures, and data indicative of road works, and wherein deviating from the route includes adjusting one or both of the favouring and penalizing so that segments of the electronic map that are further from the polyline are more likely to be included in the generated route instead of segments of the electronic map that are in greater proximity to the polyline based on the one or more of the live traffic data, the data indicative of road closures, and the data indicative of road works.

\* \* \* \* \*